(12) United States Patent
Shteynberg et al.

(10) Patent No.: US 9,054,590 B2
(45) Date of Patent: *Jun. 9, 2015

(54) APPARATUS, SYSTEM AND METHOD FOR CASCADED POWER CONVERSION

(71) Applicant: Point Somee Limited Liability Company, Dover, DE (US)

(72) Inventors: Anatoly Shteynberg, San Jose, CA (US); Harry Rodriguez, Gilroy, CA (US); Bradley M. Lehman, Belmont, MA (US)

(73) Assignee: Point Somee Limited Liability Company, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/689,685

(22) Filed: Nov. 29, 2012

(65) Prior Publication Data

US 2013/0088078 A1    Apr. 11, 2013

Related U.S. Application Data

(63) Continuation of application No. 12/181,686, filed on Jul. 29, 2008, now Pat. No. 8,344,638.

(51) Int. Cl.
  *H02M 3/335*    (2006.01)
  *H05B 33/08*    (2006.01)
  *H05B 37/02*    (2006.01)
(52) U.S. Cl.
  CPC ....... *H02M 3/33507* (2013.01); *H05B 33/0815* (2013.01); *H05B 37/02* (2013.01)

(58) Field of Classification Search
  USPC .............. 315/307–312, 185 S, 224, 246, 225
  See application file for complete search history.

(56) References Cited

U.S. PATENT DOCUMENTS

| | | | |
|---|---|---|---|
| 6,091,614 | A | 7/2000 | Malenfant |
| 6,153,985 | A | 11/2000 | Grossman |
| 6,304,464 | B1 | 10/2001 | Jacobs |
| 6,400,102 | B1 | 6/2002 | Ghanem |
| 6,441,558 | B1 | 8/2002 | Muthu |
| 6,515,434 | B1 | 2/2003 | Biebl |
| 6,557,512 | B2 | 5/2003 | Leipelt |
| 6,747,420 | B2 | 6/2004 | Barth |

(Continued)

OTHER PUBLICATIONS

Maksimović, D., and Ćuk, S., "Switching Converter With Wide DC Conversion Range," Institute of Electrical and Electronic Engineers (IEEE) Transactions on Power Electronics 6(1):151-157, Jan. 1991.

*Primary Examiner* — Tuyet Vo
(74) *Attorney, Agent, or Firm* — Christensen O'Connor Johnson Kindness PLLC

(57) ABSTRACT

An apparatus, method, and system are provided for power conversion to supply power to a load such as a plurality of light emitting diodes. An exemplary apparatus comprises: a first power converter stage having a first power switch and a first inductive element; a second power converter stage having a second power switch and a second inductive element; a plurality of sensors; and a controller. The second power converter stage provides an output current to the load. The controller is adapted to use a sensed input voltage to determine a switching period, and is further adapted to turn the first and second power switches into an on-state at a frequency substantially corresponding to the switching period while maintaining a switching duty cycle within a predetermined range.

58 Claims, 14 Drawing Sheets

(56) References Cited

U.S. PATENT DOCUMENTS 6,781,351 B2 8/2004 Mednik
7,880,400 B2 2/2011 Zhou

2003/0057869 A1* 3/2003 Ito et al. .................. 315/224
2006/0138973 A1 6/2006 Hirosawa
2009/0189548 A1 7/2009 Hoffman

* cited by examiner

APPARATUS, SYSTEM AND METHOD FOR CASCADED POWER CONVERSION

CROSS-REFERENCE TO RELATED APPLICATION

This application is a continuation of U.S. patent application Ser. No. 12/181,686, filed Jul. 29, 2008 (now U.S. Pat. No. 8,344,638).

BACKGROUND

A wide variety of off-line light-emitting diode (LED) drivers are known. For example, a capacitive drop off-line LED driver from On Semiconductor (Application Note AND8146/D) is a non-isolated driver with low efficiency, is limited to delivering relatively low power, and at most can deliver a constant current to the LED with no temperature compensation, no dimming arrangements, and no voltage or current protection for the LED.

Other isolated off-line LED drivers also have wide-ranging characteristics, such as a line frequency transformer and current regulator (On Semiconductor Application Note AND8137/D); a current mode controller (On Semiconductor Application Note AND8136/D); a white LED luminary light control system (U.S. Pat. No. 6,441,558); LED driving circuitry with light intensity feedback to control output light intensity of an LED (U.S. Pat. No. 6,153,985); a non-linear light-emitting load current control (U.S. Pat. No. 6,400,102); a flyback as an LED Driver (U.S. Pat. No. 6,304,464); a power supply for an LED (U.S. Pat. No. 6,557,512); and a voltage booster for enabling the power factor controller of an LED lamp upon a low AC or DC supply (U.S. Pat. No. 6,091,614).

In general, these various LED drivers are overly complicated. Some require control methods that are complex, some are difficult to design and implement, and others require many electronic components. A large number of components can increase cost and reduce reliability. Many drivers utilize a current mode regulator with a ramp compensation in a pulse width modulation ("PWM") circuit. Such current mode regulators require relatively many functional circuits, while nonetheless continuing to exhibit stability problems when used in the continuous current mode with a duty cycle or ratio over fifty percent. Various attempts to solve these problems utilized a constant off-time boost converter or hysteretic pulse train booster. While these solutions addressed problems of instability, these hysteretic pulse train converters exhibited other difficulties, such as elevated electromagnetic interference, inability to meet other electromagnetic compatibility requirements, and relative inefficiency. Other attempts, such as in U.S. Pat. No. 6,515,434 B1 and U.S. Pat. No. 6,747,420, provide solutions outside the original power converter stages, adding additional feedback and other circuits, rendering the LED driver even larger and more complicated.

Widespread proliferation of solid state lighting systems (semiconductor, LED-based lighting sources) has created a demand for highly efficient power converters, such as LED drivers, with high conversion ratios of input to output voltages. In order to reduce the component count, such converters may be constructed without isolation transformers by using two-stage converters with the second stage running at a very low duty cycle (equivalently referred to as a duty ratio), thereby limiting the maximum operating frequency, resulting in an increase in the size of the converter (due to the comparatively low operating frequency), and ultimately defeating the purpose of removing coupling transformers.

Various proposals to solve these problems have included use of quadratic power converters for providing a low output voltage with a wide DC conversion range, such as the quadratic power converter 10 illustrated in FIG. 1. For example, in "Switching Converter with Wide DC Conversion Range" (D. Maksimovic and S. Ćuk, May 1989 HFPC Proceedings and also in IEEE Transactions on Power Electronics, Vol. 6, No. 1, January 1991), the authors suggested using PWM converters having a single switch and featuring voltage conversion ratios with a quadratic dependence of the duty ratio. The cascaded buck and buck-boost topologies were designed and analytically synthesized for controlling the output voltage. When these circuits are used as a current source, however, they become as inadequate as conventional one-stage converters, and exhibit even more problems when used with a sinusoidal input current. For example, these circuits require a large capacitive filter following the rectified AC signal to continuously provide a steady DC output, thereby making power factor correction ("PFC") practically impossible.

Referring to FIG. 1, the input DC voltage Vg 11 is applied to the first stage (buck-boost converter), comprising of transistor 20 (controlled by some type of controller 21), first inductor 15, capacitor 16, and diode 12. When the transistor 20 is conducting, for a linear (non-saturating) inductor 15, current is building substantially linearly in the inductor 15, while diode 12 is blocked by the reverse voltage during this portion of the cycle. When the transistor 20 is off, energy stored in the inductor 15 discharges into capacitor 16, diode 12 is forward biased and conducting during part of the off-time (discontinuous mode of operation, "DCM") or completely during the off-time (continuous mode of operation, "CCM"), and the on-off cycle is repeated. The secondary stage is illustrated as a buck converter and comprises of the transistor 20, capacitor 18, second inductor 14, and diodes 13 and 17, with the load (illustrated as resistor 19) connected across capacitor 18. When the transistor 20 is conducting, energy from capacitor 16 is being transferred to the load 19 and output capacitor 18 via inductor 14, also charging it linearly, while diode 13 is conducting and diode 12 is blocked. When the transistor 20 is off and not conducting, diode 13 is reverse biased, and diode 17 is conducting, discharging inductor 14 into output capacitor 18. The operational process of the buck converter also may be either DCM or CCM. The transfer ratio of the converter 10 is $$-\frac{D^2}{1-D},$$

where D is duty cycle or ratio, with the minus sign denoting that the polarity of the output voltage is reversed compared to the input voltage. Also, currents in transistor 20 and the output load are flowing in opposite directions, creating a difficult topology for sensing operational signals and providing corresponding feedback signals (e.g., both nodes "A" and "B" are at return potentials).

The above-referenced quadratic converter is designed to work as a voltage converter with a wide conversion ratio. Were this converter 10 to be used for current control in the output load, however, various issues may arise; for example, due to any imbalance of charges, voltages across capacitors 16 and 18 may not match, creating an excessive voltage across capacitor 16, which leads either to an over-design of the power stage or lower reliability, because this converter 10 cannot work if the voltage across capacitor 16 is greater than Vg 11. For the same reason, this converter 10 cannot be used in the AC/DC topologies requiring power factor correction.

Another proposed solution in U.S. Pat. No. 6,781,351, illustrated in FIG. 2, addressed the PFC problem, providing AC/DC cascaded power converters having high DC conversion ratios and improved AC line harmonics, with low input harmonic currents, a comparatively high power factor, and efficient operation for low voltage DC outputs. These converters, however, like the quadratic converters, have floating operational signals, which are referenced to different nodes of the power stage. Such floating operational signals make the provision of feedback signals to a controller extremely difficult, effectively requiring custom, application-specific controllers for power management.

The input 31 is an AC voltage, rectified by a bridge 32 and further filtered by a small capacitor 33. The buck-boost first stage 44 includes a blocking diode 34, which allows normal operation of the buck boost 44 at any value of input voltage (at node 45), thereby creating an opportunity to provide power factor correction if the on-time of a switch 40 is relatively constant. The second stage, a buck converter, comprises of capacitor 42, inductor 39, and diodes 38 and 41, and works substantially the same as the buck converter discussed with reference to FIG. 1. In order to prevent an uncontrollable rise of the voltage across first stage capacitor 36, the converter 30 uses additional components, a coupled inductor, and an additional diode (not illustrated), which negatively affect the economics of the converter 30. A more sophisticated control technique than PWM, also described in the patent, may address the imbalance of the capacitors' charge and prevent a high voltage at the first capacitor stage, without adding additional components to the power stage. Though the converter 30 is improved compared to the converter 10 because it can operate off line using an AC input, it still has floating operational signals, requiring excessively complicated feedback connections to PWM controller 46.

Switching power converters can have high internal voltages, such as up to hundreds or thousands of volts, for example. Since power switches, capacitors, and other components may operate at high internal voltage levels, they may be subject to voltage stress, such as an electrical force or stress across a component that potentially may cause it to fail. Further, it is desirable for a power converter to be able to function properly with a range of input voltages, such as those in use in different countries. For example, standard AC power voltages can range from a low of about 95 V in the U.S. to a high of about 264 V in Europe. As input voltage varies, switching power converters typically have held output voltage at a relatively constant level by adjusting the duty ratio. This prior art strategy, however, can cause voltage stress to increase dramatically over relevant portions of the input voltage range. Switches that are able to handle such high voltage stress may be difficult to obtain, if available at all, or if they are available, they may be expensive or have other undesirable characteristics such as a slow switching response, a low gain, or a high on-resistance, any of which may serve to reduce conversion efficiency. These voltage stress issues may cause engineers to avoid using or developing two-stage converters.

Accordingly, a need remains to provide a high conversion ratio converter to generate a controlled output current, with reduced voltage stress, and with a capability for control without overly complicated feedback mechanisms. Such a converter should be optimized to run using DC as well as AC input voltages. In addition, such a converter should provide significant power factor correction when connected to an AC line for input power. The converter should be able to function properly over a relatively wide input voltage range, while providing the desired output voltage or current, and without generating excessive internal voltages or placing components under high or excessive voltage stress. Also, it would be desirable to provide an LED driver controller for such a converter, included within a system for controlling a cascaded switching power converter, constructed and arranged for supplying power to one or a plurality of LEDs, including LEDs for high-brightness applications, while simultaneously providing an overall reduction in the size and cost of the LED driver.

SUMMARY

The representative embodiments of the present disclosure provide numerous advantages for supplying power to loads such as LEDs. The various representative embodiments are capable of sustaining a plurality of types of control over such power delivery, such as providing a substantially constant current output. The representative embodiments may be provided which operate over a wide range of input voltages and with acceptable internal voltage stress levels, further providing for more available and better component selection and longer useful life for the selected components. The representative embodiments utilize a control method that provides for an accurate, stable output. The representative embodiments further provide a substantially close-to-unity power factor when connected to an AC line for input power, and further generate negligible harmonics and electromagnetic interference.

A first representative embodiment provides a system and apparatus for power conversion, in which the apparatus is couplable to a load. The load may be linear or nonlinear and may comprise a plurality of light-emitting diodes. The representative apparatus comprises: a first power converter stage comprising a first power switch and a first inductive element; a second power converter stage coupled to the first power converter stage, the second power converter stage comprising a second power switch and a second inductive element, the second power converter stage couplable to provide an output current to the load; a first sensor coupled to the second power converter stage, the first sensor adapted to sense a first parameter of the second power converter stage; and a controller coupled to the first power switch, the second power switch, and the first sensor, the controller adapted to determine a switching period, the controller adapted to turn the first and second power switches into an on-state at a frequency substantially corresponding to the switching period while maintaining a switching duty cycle within a predetermined range. As used herein, such a switching frequency typically corresponds to or is otherwise substantially related to the switching period as an inverse relationship, with the switching frequency substantially inversely proportional to the switching period.

A representative system comprises: a plurality of light-emitting diodes; a first power converter stage having a flyback configuration and comprising a first power switch and a transformer; a first sensor coupled to the first power converter stage, the first sensor adapted to sense an input voltage level of the first power converter stage; a second power converter stage having a buck configuration and coupled to the first power converter stage, the second power converter stage comprising a second power switch and an inductor, the second power converter stage coupled to the plurality of light-emitting diodes to provide an output current to the plurality of light-emitting diodes; a second sensor coupled to the second power converter stage, the second sensor comprising a sense transformer and adapted to sense an output current level or a second inductive element current level; and a controller coupled to the first power switch, the second power switch, the first sensor, and the second sensor, the controller adapted to use the sensed input voltage to determine a switching period, the controller adapted to turn the first and second power switches into an on-state at a frequency substantially corresponding to the switching period while maintaining a switching duty cycle within a predetermined range.

Another representative apparatus also couplable to a plurality of light-emitting diodes and couplable to receive an input voltage, comprises: first, a first power converter stage comprising: a first power switch; a first diode; a flyback transformer having a primary coupled to the first power switch and to the input voltage and having a secondary coupled to the first diode; a first capacitor coupled to the first transformer secondary and to the first diode; and a first sensor adapted to determine an input voltage level; second, a second power converter stage coupled to the first power converter stage, the second power converter stage couplable to provide an output current to the plurality of light-emitting diodes, with the second power converter stage comprising: an inductor coupled to the first diode and couplable to the plurality of light-emitting diodes; a second power switch coupled to the secondary of the first transformer; an isolation transformer coupled to a gate of the second power switch; a second diode coupled to the second inductor; a second capacitor coupled to the inductor and couplable to the plurality of light-emitting diodes; and a sense transformer coupled to the second power switch; and third, a controller coupled to the first power switch, the first sensor, the isolation transformer and the sense transformer, the controller adapted to use the sensed input voltage to determine a switching period, and the controller adapted to turn the first and second power switches into an on-state at a frequency substantially corresponding to the switching period while maintaining a switching duty cycle within a predetermined range.

In a representative embodiment, the controller is adapted to determine the switching period as a switching interval which maintains voltage stress of the first power switch and the second power switch (and other components, such as a first stage diode) below corresponding predetermined levels. Similarly, the controller is adapted to maintain the switching duty cycle within the predetermined range to maintain voltage stress of the first power switch and the second power switch (and other components, such as a first stage diode) below corresponding predetermined levels. In some representative embodiments, the switching duty cycle is substantially constant. In addition, the representative controller is further adapted to turn the first and second power switches into the on-state and into an off-state substantially concurrently.

In a representative embodiment, the first parameter is a current level corresponding to the output current or a second inductive element current. The first power converter stage is couplable to receive an input voltage, and the representative apparatus may further comprise: a second sensor coupled to the first power converter stage, the second sensor adapted to sense an input voltage level. The first sensor and second sensors may be referenced to a common reference, such as a ground potential.

The controller may be further adapted to turn the first and second power switches into the on-state and into an off-state with a switching period determined in response to the first parameter. For example, the controller may be further adapted to turn the first and second power switches into an off-state when the first parameter has increased to a first threshold, and to turn the first and second power switches into an on-state when the first parameter has decreased to a second threshold.

In a representative embodiment, the controller may be further adapted to determine the first threshold and the second threshold as substantially related to a predetermined reference current level, a predetermined current variance level, a minimum input voltage level, and a sensed input voltage level. (As used herein, "substantially related to" means and includes a wide variety of relationships, including without limitation, exact equality, substantial equality, about equal to, proportional to, inversely proportional to, is affected by, etc., and any and all combinations of such relationships (e.g., directly proportional to a square of a first parameter and inversely proportional to a second parameter). Similarly, as used herein, "substantially proportional to" means and includes a wide variety of proportional relationships, including without limitation, exact equality, substantial equality, about equal to, proportional to, inversely proportional to, etc., and any and all combinations of such relationships (e.g., directly proportional to a square of a first parameter and inversely proportional to a second parameter).) For example, the controller may be further adapted to determine the first threshold ($I_{MAX}$) as substantially equal to a predetermined reference current level ($I_{REF}$) plus an offset term, and the second threshold ($I_{MIN}$) as substantially equal to a predetermined reference current level ($I_{REF}$) minus the offset term, with the offset term comprising a predetermined current variance level ($\Delta I_{L2}$) multiplied by the square of a minimum RMS input voltage ($V^2_{LOW\_RMS}$) and divided by twice the square of an RMS value of the sensed input voltage ($2*V^2_{IN\_RMS}$) ($I_{MAX} \approx I_{REF}+(\Delta I_{L2}*V^2_{LOW\_RMS}/2*V^2_{IN\_RMS})$) and ($I_{MIN} \approx I_{REF}-(\Delta I_{L2}*V^2_{LOW\_RMS}/2*V^2_{IN\_RMS})$).

Representative embodiments may further comprise a memory storing a look-up table, the look-up table comprising a plurality of first and second thresholds corresponding to a plurality of input voltage levels. The representative controller may be further adapted to determine the first threshold and the second threshold by accessing the look-up table using the sensed input voltage.

A representative memory may also store a predetermined parameter, wherein the predetermined parameter comprises at least one of the following parameters: a minimum switching period, a maximum switching period, a maximum duty ratio, a minimum duty ratio, a desired output current level, a desired inductor current level, a maximum input voltage, a minimum input voltage, a minimum RMS input voltage, a desired inductor ripple current, a desired output ripple current, and a maximum voltage stress level.

In another representative embodiment, the switching period corresponds to a first threshold and to a second threshold, and wherein the controller is further adapted to turn the first and second power switches into an off-state when the first parameter has increased to the first threshold and into the on-state when the first parameter has decreased to the second threshold.

In various representative embodiments, the controller may be further adapted to determine the switching period in response to the sensed input voltage level. Representative embodiments may further comprise a memory storing a look-up table, the look-up table comprising a plurality of switching period values corresponding to a plurality of input voltage levels. The representative controller may be further adapted to determine the switching period by accessing the look-up table using the sensed input voltage.

In some representative embodiments, the controller may be further adapted to determine the switching period based on a maximum switching period, a minimum input voltage, and the sensed input voltage. For example, the controller may be further adapted to determine the switching period (T) as substantially proportional to a maximum switching period multiplied by the square of a minimum RMS input voltage and divided by the square of an RMS value of the sensed input voltage ($T \propto T_{MAX}*V^2_{LOW\_RMS}/V^2_{IN\_RMS}$), or as substantially proportional to a minimum switching period multiplied by the square of a maximum RMS input voltage and divided by the square of an RMS value of the sensed input voltage ($T \propto T_{MIN}*V^2_{HIGH\_RMS}/V^2_{IN\_RMS}$). Also for example, the controller may be further adapted to determine the switching period (T) as substantially proportional to a selected switching period ($T_1$) multiplied by the square of a selected RMS input voltage ($V_{1\_RMS}$) and divided by the square of an RMS value of the sensed input voltage ($T \propto T_1*V^2_{1\_RMS}V^2_{IN\_RMS}$).

The representative controller may be further adapted to decrease the duty cycle when the output current is above a first predetermined level, and to increase the duty cycle when the output current is below a second predetermined level.

In a representative embodiment, the first power converter stage comprises a flyback configuration, or a buck configuration, or a double-buck configuration, and the second power converter stage comprises a buck configuration, or a boost configuration, or a buck-boost configuration. In such representative embodiments, the first inductive element may comprise a transformer and the second inductive element comprises an inductor, while in other representative embodiments, the first inductive element comprises at least one first inductor and the second inductive element comprises a second inductor.

In another representative embodiment, the controller is further adapted to operate the first power converter stage in a discontinuous conduction mode and to operate the second power converter stage in a continuous conduction mode. In addition, the first power converter stage is couplable to receive an input voltage having a predetermined range of voltages, such as substantially from 90 V RMS to 264 V RMS. The first power converter stage also may further comprise a rectifier couplable to receive an AC input voltage.

In another representative embodiment, a method is disclosed for providing power conversion for a load using a power converter comprising a first power converter stage coupled to a second power converter stage, the first power converter stage comprising a first inductive element and a first power switch and the second power converter stage comprising a second inductive element and a second power switch. The representative method comprises: sensing a first parameter comprising an input voltage; sensing a second parameter, the second parameter comprising an output current or a second inductive element current; using the sensed input voltage, determining a switching period; turning the first and second power switches into an on-state substantially concurrently and at a frequency substantially equal to the switching period; and turning the first and second power switches into an off-state substantially concurrently while maintaining a switching duty cycle within a predetermined range.

In some representative embodiments, the switching duty cycle is substantially constant. In various representative embodiments, the switching period corresponds to a first threshold and to a second threshold, wherein the step of turning the first and second power switches into the off-state further comprises turning the first and second power switches into the off-state when the first parameter has increased to the first threshold; and wherein the step of turning the first and second power switches into the on-state further comprises turning the first and second power switches into the on-state when the first parameter has decreased to the second threshold.

A representative method embodiment may further comprise using a predetermined reference current level, a predetermined current variance level, a minimum input voltage level, and the sensed input voltage level, determining the first threshold and the second threshold. In another representative embodiment, the method further comprises using the sensed input voltage level, accessing a memory to determine the first threshold and the second threshold; or using a sensed input voltage level, accessing a memory to determine the switching period. In yet another representative embodiment, the method further comprises using a maximum switching period, a minimum input voltage, and the sensed input voltage, determining the switching period. Another representative method embodiment further comprises decreasing the duty cycle when the output current is above a first predetermined level; and increasing the duty cycle when the output current is below a second predetermined level.

Lastly, a representative method embodiment may further comprise operating the first power converter stage in a discontinuous conduction mode and operating the second power converter stage in a continuous conduction mode. Such a representative method may also include receiving an input voltage having a predetermined range of voltages.

Numerous other advantages and features of the present disclosure will become readily apparent from the following detailed description, from the claims, and from the accompanying drawings.

BRIEF DESCRIPTION OF THE DRAWINGS

The features and advantages of the present disclosure will be more readily appreciated upon reference to the following description when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which.

DETAILED DESCRIPTION

Figure 1:
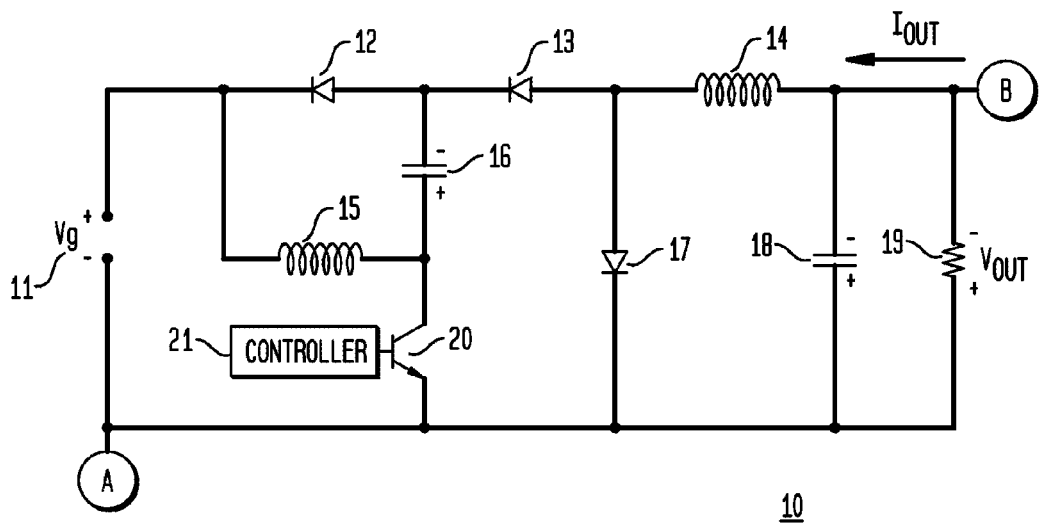
FIG. 1 is a circuit diagram illustrating a prior art quadratic converter.
Figure 2:
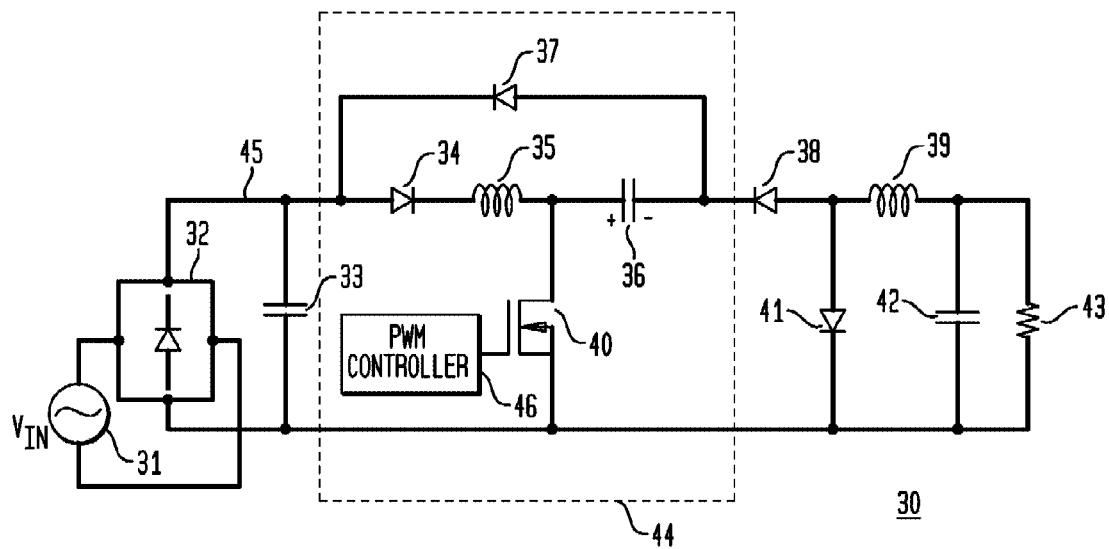
FIG. 2 is a circuit diagram illustrating a prior art cascaded converter.

While the present disclosure is susceptible of embodiment in many different forms, there are shown in the drawings and will be described herein in detail specific representative embodiments thereof, with the understanding that the present description is to be considered as an exemplification of the principles of the disclosure and is not intended to limit the disclosure to the specific embodiments illustrated. In this respect, before explaining at least one embodiment consistent with the present disclosure in detail, it is to be understood that the disclosure is not limited in its application to the details of construction and to the arrangements of components set forth above and below, illustrated in the drawings, or as described in the examples. Methods and apparatuses consistent with the present disclosure are capable of other embodiments and of being practiced and carried out in various ways. Also, it is to be understood that the phraseology and terminology employed herein, as well as the abstract included below, are for the purposes of description and should not be regarded as limiting.

Figure 3:
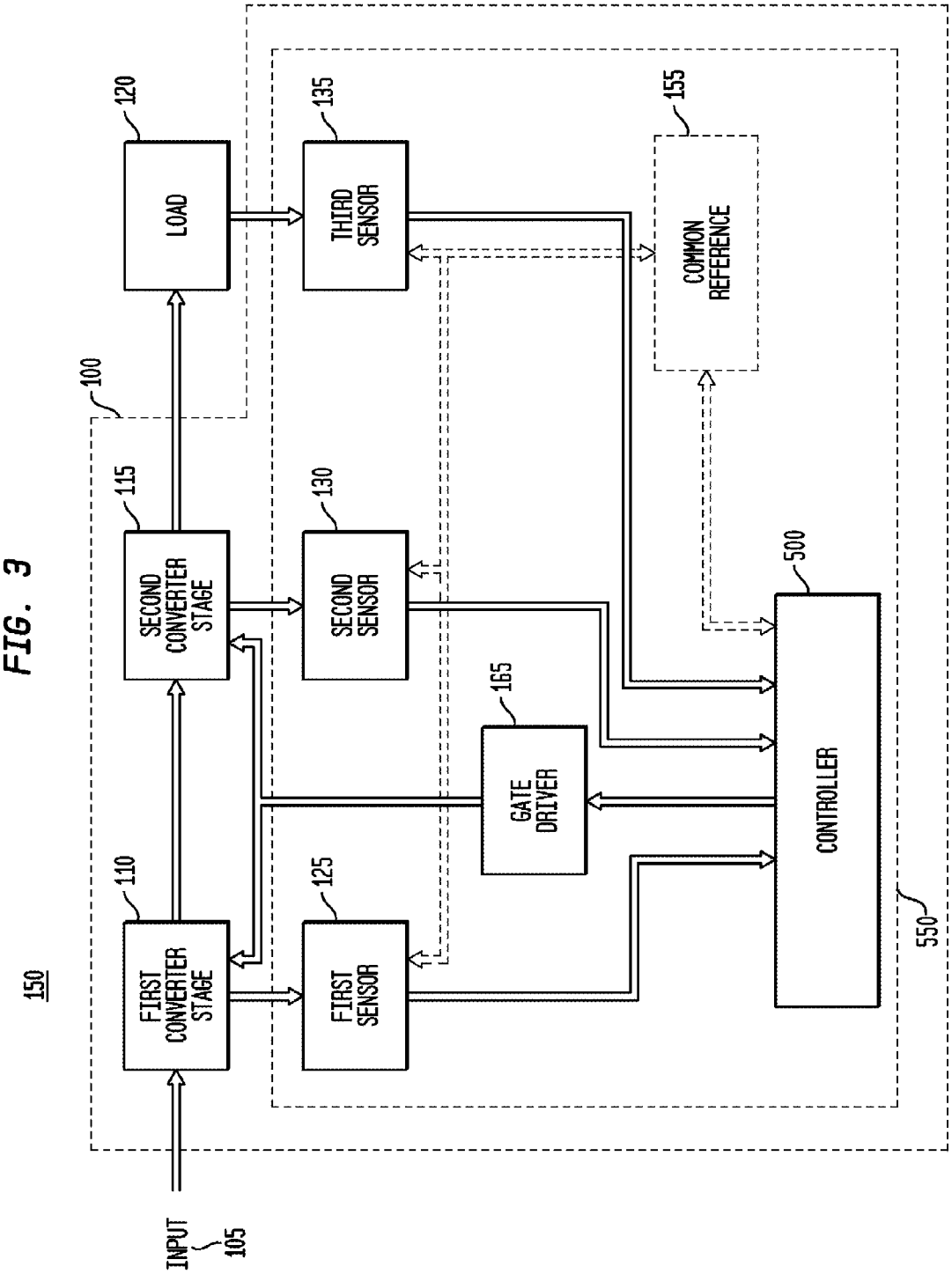
FIG. 3 is a block diagram illustrating a first representative system, a first representative regulator, and a first representative apparatus in accordance with the teachings of the present disclosure.

FIG. 3 is a block diagram illustrating a first representative system 150, a first representative regulator 550, and a first representative apparatus 100 in accordance with the teachings of the present disclosure. The system 150 comprises the apparatus 100 and a load 120, and is couplable to receive input power, such as an AC or DC input voltage, from input 105 which is couplable or connected to first converter stage 110. (AC and DC input voltages as referred to herein and within the scope of the present disclosure are discussed in greater detail following the discussion of FIG. 15). The first representative apparatus 100 comprises the first converter stage 110, a second converter stage 115, a controller 500, and a plurality of sensors, illustrated as a first sensor 125, a second sensor 130, and a third sensor 135. (Additional sensors may also be utilized, such as an optional fourth, fifth, and sixth sensors discussed with reference to FIG. 6, as well as a fewer number of sensors, as discussed with reference to FIG. 10.) The controller 500 may be any type of controller, processor, other integrated circuit or portion of an integrated circuit, for example, and is discussed in greater detail below with reference to FIG. 10. In addition, the controller 500 may have any number of inputs and outputs, depending on the selected embodiment.

As illustrated, the first representative apparatus 100 also typically comprises a gate driver 165, which may be a separate component or which may be considered to be part of the controller 500. The plurality of sensors may have a common reference 155, such as being referenced to a common node such as a ground potential. The common reference 155 is sometimes illustratively shown herein as a ground potential, however it is to be understood that one or more alternative references are considered equivalent and within the scope of the present disclosure. Sensors 125, 130, and 135 each have one or more inputs and one or more outputs. Additional sensors may also be utilized. Sensors may be referenced to common reference 155, other nodes, or they may be floating. For example, sensors may use "low-side" or "high-side" sensing. The regulator portion of the apparatus 100 (first representative regulator 550) comprises the controller 500 and the various sensors 125, 130, and 135. Gate driver 165 couples one or more output signals from controller 500 to first and second converter stages 110 and 115 and may perform one or more functions such as current limiting, overload protection, voltage translation, signal inversion, amplification, impedance matching, attenuation, signal conditioning, isolation, etc., and depending upon the selected configuration, additional gate drivers may also be utilized. In an representative embodiment, gate driver 165 comprises one or more amplifiers, resistors, capacitors, transformers, and other passive and active components. In some of the descriptions and illustrations herein, operation of controller 500 may be discussed without reference to gate driver 165; it is to be understood, however, that various embodiments will utilize a gate driver where appropriate. The first converter stage 110 typically comprises a first switch and a first inductive element such as a transformer or inductor. The second converter stage 115 typically comprises a second switch and a second inductive element such as a transformer or inductor. In various representative embodiments, the first and second converter stages 110 and 115 may share a common switch. The apparatus 100 receives the input 105, such as an AC or DC voltage. Using feedback provided by the plurality of sensors 125, 130, and 135, the controller 500 generates one or more control signals which are provided (via the gate driver 165) to first converter stage 110 and second converter stage 115, such as a control signal for turning a switch into an on and conducting state, or turning a switch into an off and substantially non-conducting state, to provide a controlled current to the load 120, such as one or more LEDs, optionally configured as an LED array comprising one or more strings of LEDs. In a representative embodiment, an output signal from the controller 500 (provided via the gate driver 165) comprises a series or sequence of control pulses that turn power switches off and on in the first and second converter stages 110 and 115. According to the representative embodiments of the disclosure, this results in sourcing a substantially constant current to the output load or, when applied to LEDs, driving a single LED, a plurality of LEDs, or an array or plurality of strings of LEDs.

It should be noted that functions shown in FIG. 3 may be combined, and in some cases, bypassed, within the scope of the present disclosure and without changing the operation of system 150, apparatus 100, and regulator 550. For example and without limitation, in various representative embodiments, gate driver 165 is a separate circuit element (as illustrated in FIG. 3), while in other representative embodiments (not separately illustrated), controller 500 directly drives the gates of switches in converter stages 110 and 115 and is connected directly to the switches without utilizing a gate driver, or gate driver 165 is incorporated into controller 500, or gate driver 165 is incorporated into first converter stage 110 and/or second converter stage 115. In the representative embodiment illustrated in FIG. 3, sensors 125, 130, and 135 are shown as separate circuit elements. In alternative representative embodiments, such sensors may be incorporated into the corresponding circuitry they are configured to sense. For example, first sensor 125 may be implemented as part of first converter stage 110, second sensor 130 may be implemented as part of second converter stage 115, and third sensor 135 may be implemented as part of load 120 or second converter stage 115. In another representative embodiment, one or more of sensors 125, 130, 135 are implemented as part of controller 500. In addition, in FIG. 3 and in other figures shown herein, a given signal arrow may represent one or more wires or other conductors for transmission of one or more signals.

Figure 4:
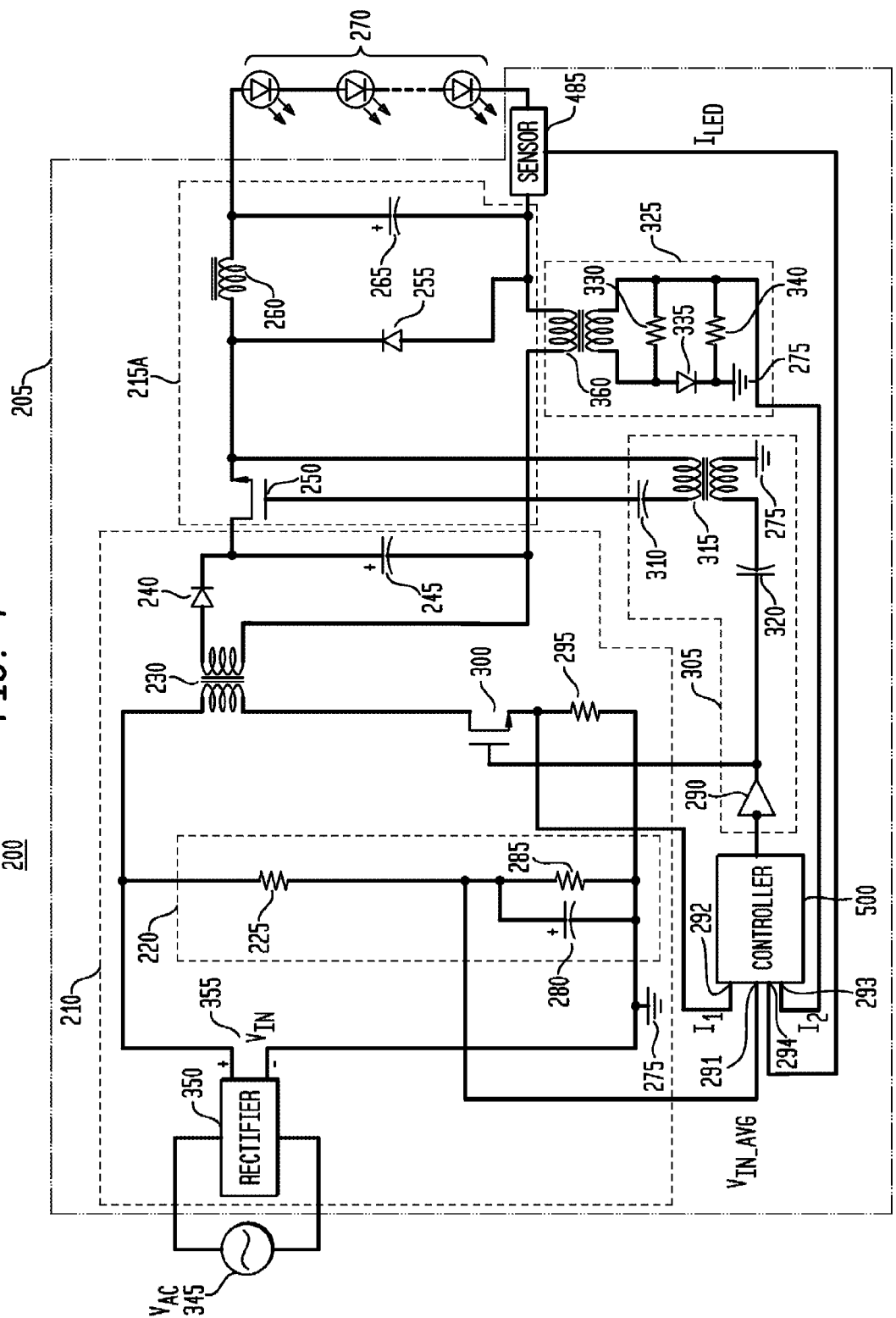
FIG. 4 is a block and circuit diagram illustrating a second representative system and a second representative apparatus in accordance with the teachings of the present disclosure.

FIG. 4 is a block and circuit diagram illustrating a second representative system 200 and a second representative apparatus 205 (such as an LED driver with a cascaded converter), in accordance with the teachings of the present disclosure. A regulator portion of the apparatus 205 is not separately illustrated, but may be considered to comprise the controller 500 and at least some of the various sensors discussed below. As illustrated, first stage 210, second stage 215A, gate driver 305, first sensor 220, and second sensor 325 are demarcated by dotted lines and apparatus 205 is demarcated by the dot-dash line. The system 200 comprises the apparatus 205 and a load, illustrated as LED array 270, and is couplable to receive input power, such as an AC or DC input power, such as an AC input voltage $V_{AC}$ 345 and/or a DC input voltage $V_{IN}$ 355 which is couplable or connected to the first stage 210. The power source $V_{AC}$ 345 is illustratively shown as AC, but it may alternatively be DC. As illustrated, $V_{AC}$ 345 is converted to DC by rectifier 350 to generate $V_{IN}$ 355. Rectifier 350 may be a full-wave rectifier, a full-wave bridge, a half-wave rectifier, an electromechanical rectifier, or another type of rectifier. When utilized with a DC power source, rectifier 350 is typically not included in the apparatus 205 or system 200. The operation of the apparatus 205 will be explained generally with reference to DC power $V_{IN}$ 355 as an input power source with the understanding that rectifier 350 is used where appropriate, depending on the nature of available power.

The representative first stage 210 is illustrated as a flyback converter and comprises a first transformer 230 (as a representative first inductive element), a first power switch 300, a first diode 240, a first capacitor 245, one or more of a plurality of sensors (illustrated as sensor 220 (comprising a first sense resistor 225, a second sense resistor 285, and a third capacitor 280) and a third sense resistor 295), and optionally the rectifier 350. The representative second stage 215A is illustrated as a buck converter and comprises a second power switch 250, a second diode 255, an inductor 260 (as a representative second inductive element), and a second capacitor 265. Switches 300 and 250 are illustratively shown as N-channel MOSFETs. It should also be noted that switches 300 and 250 may be implemented as any type of power switch, in addition to the illustrated n-channel MOSFETs, including without limitation a bipolar junction transistor, a p-channel MOSFET, various enhancement or depletion mode FETs, etc., and that a plurality of other power switches also may be utilized in the circuitry, depending on the selected embodiment.

A third sensor comprises a third sense resistor 295. A second sensor 325 comprises transformer 360, fourth sense resistor 330, fifth sense resistor 340, and third diode 335. The first sensor 220 comprises first sense resistor 225, second sense resistor 285, and third capacitor 280. In an alternative embodiment, an optional load current sensor 485 is provided in series with LED array 270 and is utilized to determine the load current ("$I_{LED}$") through LED array 270. Such a sensor 485 may be a sense resistor, a sensor comprising a plurality of components similar to second sensor 325, or any other type of sensor. While FIG. 4 illustrates a representative embodiment with selected sensor locations, implementations, and configurations as shown, there are innumerable other sensor locations, implementations, and configurations, any and all of which are considered equivalent and within the scope of the present disclosure.

In FIG. 4 and elsewhere in this description, sensed, measured, or otherwise determined circuit parameters may include current through the LED array 270, LED brightness (as measured by optical sensors), voltage across first capacitor 245, voltage across second capacitor 265, average current through the second inductive element (inductor 260 in FIG. 4), input voltage (e.g., as determined through first sensor 220), etc. One or more measurements may be taken and used by controller 500 to adjust any selected or predetermined operating parameters, for example, to bring the output current closer to a desired value. In a representative embodiment, controller 500 adjusts an operating parameter comprising the amount of time switches 300 and 250 remain on during a switching cycle.

Rectifier 350 is couplable to the power source $V_{AC}$ 345 to provide $V_{IN}$ 355. The positive side of $V_{IN}$ 355 is coupled to a first terminal of the primary side of first transformer 230 and to a first terminal of first sense resistor 225. A second terminal of first sense resistor 225 is coupled to a first terminal of second sense resistor 285, to the positive side of third capacitor 280, and to input 291 ("$V_{IN\_AVG}$") of controller 500. First sense resistor 225 and second sense resistor 285 serve as a voltage divider responsive to input voltage $V_{IN}$ 355 and act in conjunction with third capacitor 280 to form a low pass filter, to average input voltage $V_{IN}$ 355 to generate an average input voltage determination (referred to herein as "$V_{IN\_AVG}$"). A second terminal of the primary side of first transformer 230 is coupled to the drain of first power switch 300. The source of first power switch 300 is coupled to a first terminal of third sense resistor 295 and to input 292 ("$I_1$") of controller 500. A second terminal of third sense resistor 295 is coupled to the negative side of $V_{IN}$ 355, a second terminal of second sense resistor 285, the negative side of third capacitor 280, and to ground 275, which is providing a common reference for sensor 220 and third sense resistor 295. A first terminal of the secondary side of first transformer 230 is coupled to the anode of first diode 240. The cathode of first diode 240 is coupled to the positive side of first capacitor 245 and to the drain of second power switch 250. The source of second power switch 250 is coupled to the cathode of second diode 255, to a first terminal of inductor 260, and to a second terminal of the secondary side of third transformer 315. A second terminal of inductor 260 is coupled to the positive side of second capacitor 265 and is couplable to the (positive drive side of) LED array 270.

A second terminal of the secondary side of first transformer 230 is coupled to the negative terminal of first capacitor 245 and to a first terminal of the primary side of second transformer 360. A second terminal of the primary side of second transformer 360 is coupled to the anode of second diode 255, the negative side of second capacitor 265, and is couplable to the (negative drive side of) LED array 270. A first terminal of the secondary side of second transformer 360 is coupled to the anode of third diode 335 and a first terminal of fourth sense resistor 330. The cathode of third diode 335 is coupled to ground 275 and to a first terminal of fifth sense resistor 340. A second terminal of the secondary side of second transformer 360 is coupled to a second terminal of fourth sense resistor 330, a second terminal of fifth sense resistor 340, and input 293 ("I₂") of controller 500.

The output of controller 500 is coupled via the driver 305 to the gates of the power switches 300 and 250 of the respective first and second stages 210, 215A, for control of the on and off durations of these switches (switching period and duty cycle). (As used herein, duty cycle will be understood to mean and refer to the ratio of switch on-time ($t_{ON}$) to the switching period ("T") (where T≈$t_{ON}$+$t_{OFF}$) or, stated another way, the proportion of the switching period during which the switches are in an on-state and conducting.) Gate driver 305 comprises driver 290, fourth capacitor 320, fifth capacitor 310, and third transformer 315, and is utilized, among other things, to provide isolation of the second stage 215A. The output of driver 290 is coupled to the gate of first power switch 300 and to a first terminal of fourth capacitor 320. A second terminal of fourth capacitor 320 is coupled to a first terminal of the primary side of third transformer 315. A second terminal of the primary side of third transformer 315 is coupled to ground. A first terminal of the secondary side of third transformer 315 is coupled to a first terminal of fifth capacitor 310. A second terminal of fifth capacitor 310 is coupled to the gate of second power switch 250.

In this representative embodiment, power switches 300 and 250 are synchronized so that they turn off and on at substantially or approximately the same time. While the switching on and off of the power switches 300 and 250 is generally substantially concurrent, there may be various and differing delays involved in the reception of control signals at the gates of the power switches 300 and 250, such as due to intervening drivers and use of different types of drivers for the different power switches 300 and 250, for example, such as those illustrated in FIGS. 4, 5, and 7. Accordingly, substantially concurrent switching of the power switches 300 and 250 should be understood to be approximately concurrent to account for such potentially different or asymmetrical transmission delays of the control signals from controller 500. When first power switch 300 is on (for the duration $t_{ON}$), current from the positive side of $V_{IN}$ 355 flows through the primary side of first transformer 230, through first power switch 300, through third sense resistor 295, and back to the negative side of $V_{IN}$ 355, transferring energy from $V_{IN}$ 355 to first transformer 230. During the same time interval ($t_{ON}$), second power switch 250 is also on and conducting, so first capacitor 245 discharges through second power switch 250, storing energy in inductor 260 and second capacitor 265. When first power switch 300 is off (for the duration $t_{OFF}$), the secondary of first transformer 230 discharges into first capacitor 245. During the same time interval ($t_{OFF}$), second power switch 250 is also off, so inductor 260 discharges into second capacitor 265 and into the load, LED array 270.

Figure 5:
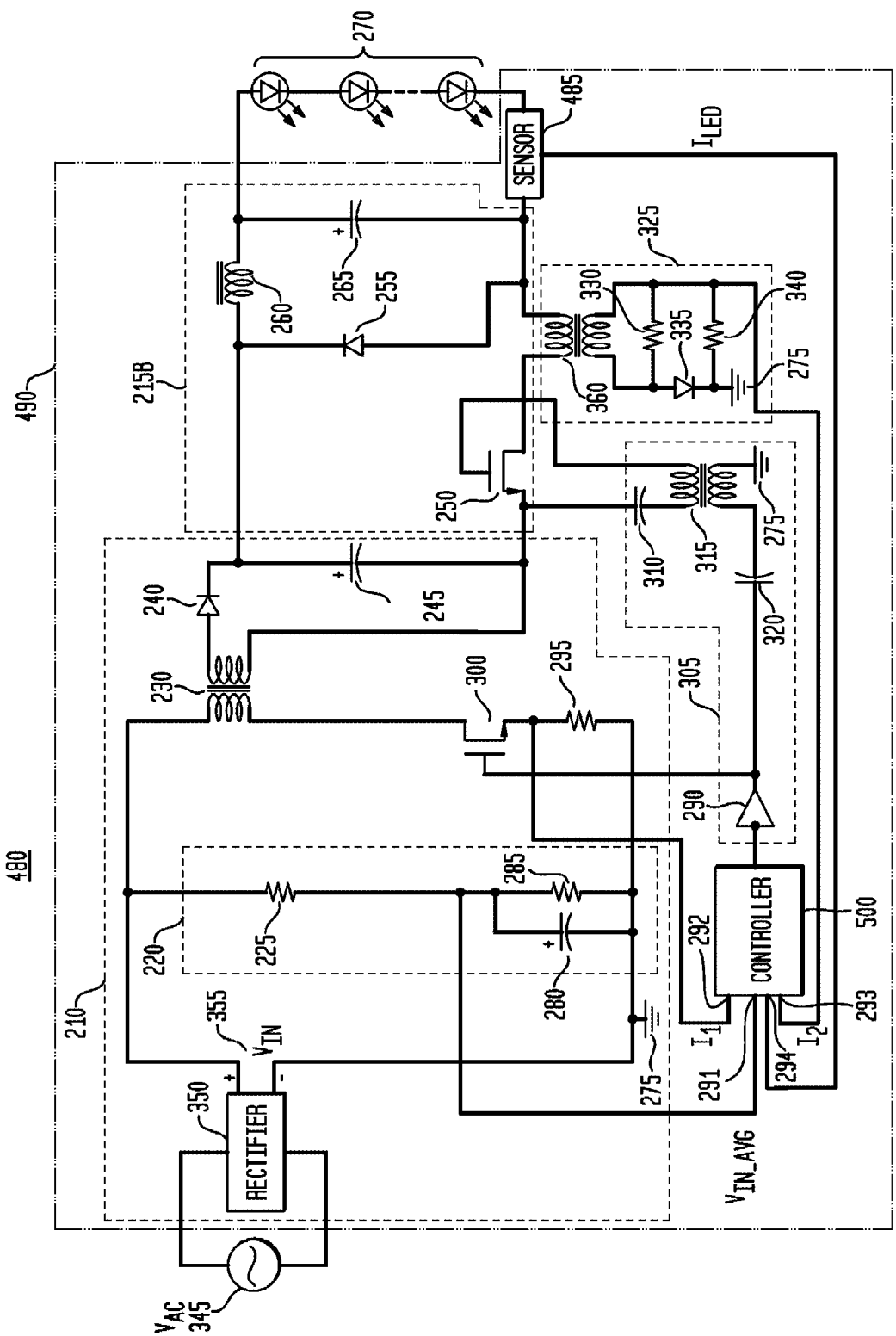
FIG. 5 is a block and circuit diagram illustrating a third representative system and a third representative apparatus in accordance with the teachings of the present disclosure.

FIG. 5 is a block and circuit diagram illustrating a third representative system 480 and a third representative apparatus 490 (such as an LED driver with a cascaded converter), in accordance with the teachings of the present disclosure. As illustrated, the third representative system 480 and the third representative apparatus 490 differ from the respective second representative system 200 and the second representative apparatus 205 insofar as second power switch 250 is provided on the "low side" of the second stage 215B, with the second power switch 250 having slightly different couplings to the driver 305 as illustrated, and with the other components coupled as illustrated due to the change in the second power switch 250 configuration in the circuit. The first stage 210, second stage 215B, gate driver 305, first sensor 220, and second sensor 325 are also demarcated by dotted lines and apparatus 490 is demarcated by the dot-dash line. The system 480 comprises the apparatus 490 and a load, illustrated as LED array 270.

More particularly, with respect to the circuit configuration of apparatus 490 compared to apparatus 205, a first terminal of the secondary side of first transformer 230 is coupled to the anode of first diode 240. The cathode of first diode 240 is coupled to the positive side of first capacitor 245, a first terminal of inductor 260, and the cathode of diode 255. A second terminal of inductor 260 is coupled to the positive side of second capacitor 265 and is couplable to the positive drive side of LED array 270.

Continuing to refer to FIG. 5, a second terminal of the secondary side of first transformer 230 is coupled to the negative terminal of first capacitor 245, to a first terminal of fifth capacitor 310, and to the source of second power switch 250. The drain of second power switch 250 is coupled to a first terminal of the primary side of second transformer 360. The gate of switch 250 is coupled to the second terminal of the secondary side of third transformer 315.

In this representative embodiment of the disclosure, power switches 300 and 250 are also synchronized so that they turn off and on at substantially the same time. When first power switch 300 is on (for the duration $t_{ON}$), current from the positive side of $V_{IN}$ 355 flows through the primary side of first transformer 230, through first power switch 300, through third sense resistor 295, and back to the negative side of $V_{IN}$ 355, transferring energy from $V_{IN}$ 355 to first transformer 230. During the same time interval $t_{ON}$, second power switch 250 is on, so first capacitor 245 discharges and stores energy in inductor 260 and second capacitor 265. When first power switch 300 is off (for the duration $t_{OFF}$), the secondary of first transformer 230 discharges into first capacitor 245. During the same time interval $t_{OFF}$, second power switch 250 is off, so inductor 260 discharges into second capacitor 265 and into the load, LED array 270.

Figure 6:
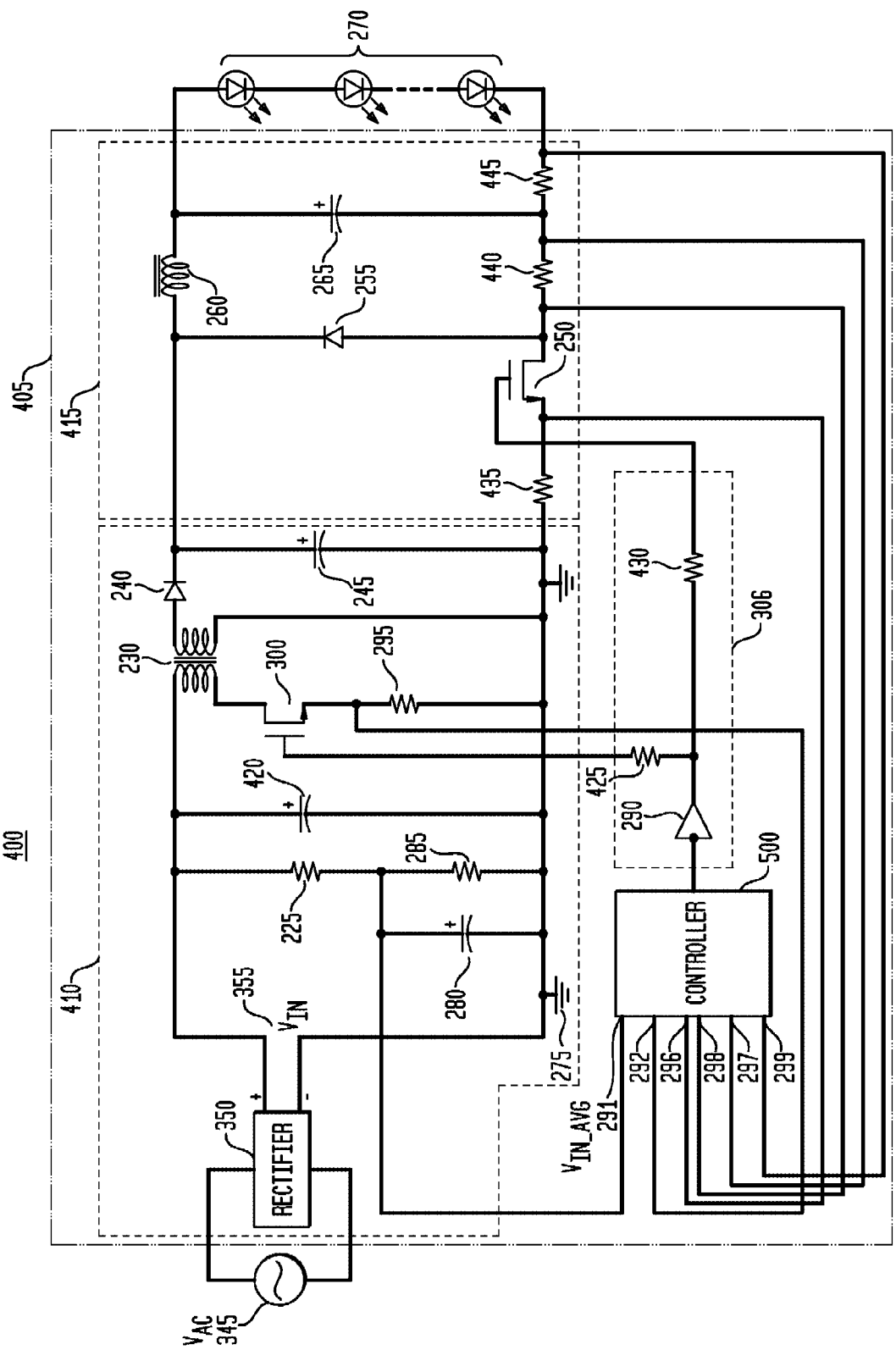
FIG. 6 is a block and circuit diagram illustrating a fourth representative system and a fourth representative apparatus in accordance with the teachings of the present disclosure.

FIG. 6 is a block and circuit diagram illustrating a fourth representative system 400 and a fourth representative apparatus 405 (such as an LED driver with a cascaded converter), in accordance with the teachings of the present disclosure. A regulator portion of the apparatus 405 is not separately illustrated, but may be considered to comprise the controller 500 and at least some of the various sensors discussed below. As illustrated, first stage 410, second stage 415, and driver 306 are demarcated by dotted lines and apparatus 405 is demarcated by the dot-dash line. The system 400 comprises the apparatus 405 and a load, illustrated as LED array 270, and is couplable to receive input power, such as an AC or DC input power, as discussed above. As illustrated, the fourth representative system 400 and the fourth representative apparatus 405 differ from the respective third representative system 480 and the third representative apparatus 490 insofar as various sensors are located and configured differently, using a plurality of sense resistors (435, 440, 445) rather than the sensors 325 and 485, a driver 306 is utilized instead of the driver 305, and with the other components coupled as illustrated due to the changes in sensor and driver configurations in the circuit.

More particularly, the first stage 410 is also a flyback converter, and in addition to the components discussed above, further comprises a fourth capacitor 420 coupled to the rectifier 350 and the first transformer 230, and is utilized to reduce voltage fluctuations in $V_{IN}$ 355. A gate driver 306 comprises driver 290, ninth resistor 425, and tenth resistor 430. (In one embodiment, resistors 425 and 430 are considered as being separate from first stage 410 and second stage 415, respectively. In an alternative embodiment (not separately illustrated), resistors 425 and 430 are considered to be part of first stage 410 and second stage 415, respectively.) The output of controller 500 is coupled to the input of driver 290, and the output of driver 290 is coupled to a first terminal of ninth resistor 425 and to a first terminal of tenth resistor 430. A second terminal of ninth resistor 425 is coupled to the gate of first power switch 300, and a second terminal of tenth resistor 430 is coupled to the gate of second power switch 250.

The second stage 415 is also a buck converter, and in addition to the components discussed above, further comprises other sensors illustrated and embodied as a sixth sense resistor 435, a seventh sense resistor 440, and an eighth sense resistor 445. Innumerable other or additional sensor locations and configurations, any and all of which are considered equivalent and within the scope of the present disclosure.

Continuing to refer to FIG. 6, a second terminal of the sixth sense resistor 435 is coupled to the source of second power switch 250 and to input 296 of controller 500. The drain of second power switch 250 is coupled to the anode of second diode 255, input 298 of controller 500, and a first terminal of the seventh sense resistor 440. A second terminal of the seventh sense resistor 440 is coupled to the negative side of the second capacitor 265, a first terminal of the eighth sense resistor 445, and to input 297 of controller 500. Controller inputs 297 and 298 are configured to measure voltage across the seventh sense resistor 440 and may utilize a corresponding two connections, one to each terminal of seventh resistor 440, as shown. A second terminal of the eighth sense resistor 445 is couplable to the negative drive side of LED array 270 and to input 299 of controller 500. In a representative embodiment, current ("$I_{LED}$") through the load (LED array 270) is determined by controller 500 using the eighth sense resistor 445 (using inputs 297, 299). Also in a representative embodiment of the present disclosure, controller 500 determines the current of inductor 260 ("$I_{L2}$") using sense resistor 440.

Sense resistors 285, 295, 435, 440, and 445 are utilized in current sensing by developing a voltage between a first terminal and a second terminal of each resistor and the voltages are measured by corresponding circuitry within the controller 500. For example and without limitation, when a sense resistor is connected to a common reference such as ground, the controller 500 may determine the voltage directly; otherwise, voltage may be sensed by subtracting the voltage at a first terminal of a sense resistor from the voltage at a second terminal of the sense resistor, or by using a "high-side" sensing technique, also for example and without limitation. It is to be understood that the current sensing circuits and configuration illustrated in FIG. 6 may apply to sense resistors in other embodiments described herein, including without limitation, various sensors and configurations in FIG. 3, FIG. 4, FIG. 5, and FIG. 7.

In this representative embodiment of the disclosure, power switches 300 and 250 are also synchronized so that they turn off and on at substantially the same time, and the apparatus 405 and system 400 operate similarly to the apparatus 490 and system 480 discussed above. When first power switch 300 is on (for the duration $t_{ON}$), current from the positive side of $V_{IN}$ 355 flows through the primary side of first transformer 230, through first power switch 300, through third sense resistor 295, and back to the negative side of $V_{IN}$ 355, transferring energy from $V_{IN}$ 355 to first transformer 230. During the same time interval $t_{ON}$, second power switch 250 is on, so first capacitor 245 discharges and stores energy in inductor 260 and second capacitor 265. When first power switch 300 is off (for the duration $t_{OFF}$), the secondary of first transformer 230 discharges into first capacitor 245. During the same time interval $t_{OFF}$, second power switch 250 is off, so inductor 260 discharges into second capacitor 265 and into the load, LED array 270.

Figure 7:
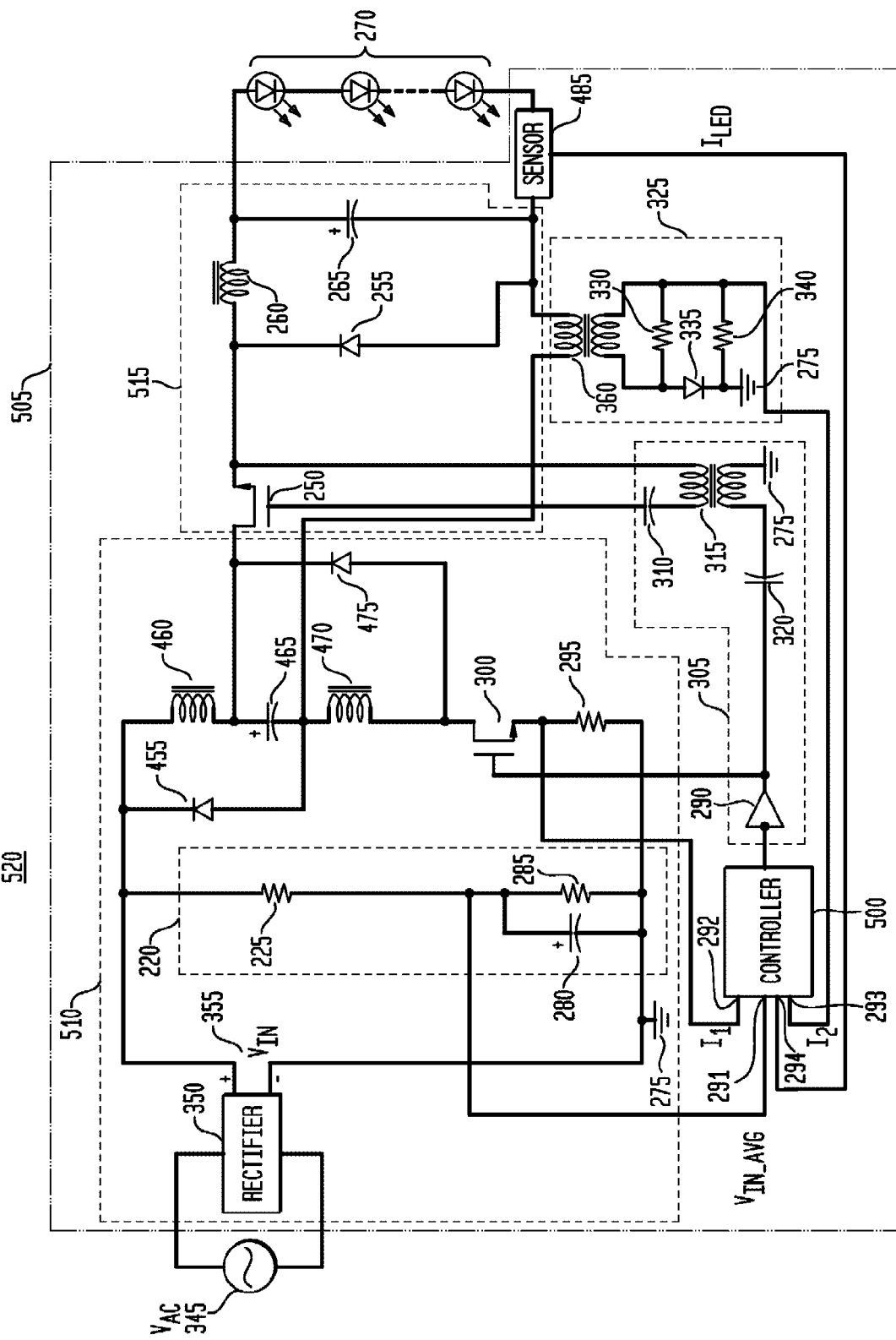
FIG. 7 is a block and circuit diagram illustrating a fifth representative system and a fifth representative apparatus in accordance with the teachings of the present disclosure.

FIG. 7 is a block and circuit diagram illustrating a fifth representative system 520 and a fifth representative apparatus 505 (such as an LED driver with a cascaded converter), in accordance with the teachings of the present disclosure. A regulator portion of the apparatus 505 is not separately illustrated, but may be considered to comprise the controller 500 and at least some of the various sensors discussed below. As illustrated, first stage 510, second stage 515, gate driver 305, first sensor 220, and second sensor 325 are demarcated by dotted lines and apparatus 505 is demarcated by the dot-dash line. The system 520 comprises the apparatus 505 and a load, illustrated as LED array 270, and is also couplable to receive input power, such as an AC or DC input power, also as discussed above. The apparatus 505 and system 520 differ from the previously discussed apparatuses and systems with the first converter stage 510 comprising a double buck converter, rather than a flyback converter, and illustrates yet an additional circuit topology which may be utilized equivalently and within the scope of the present disclosure.

More particularly, the apparatus 505 differs from those discussed previously with the first stage 510 being a double buck converter and comprising rectifier 350; a first inductive element which, in this configuration, comprises two inductive components, namely, a first inductor 460 and a second inductor 470; a first power switch 300, a plurality of diodes (a first diode 455 and a second diode 475); a plurality of sensors (illustrated as a first sense resistor 225, a second sense resistor 285, and a third sense resistor 295), and a plurality of capacitors (a first capacitor 465 and a third capacitor 280). The second stage 515 is also a buck converter having the same configuration discussed previously with reference to second stage 215A of FIG. 4, and comprises a second power switch 250, a third diode 255, a second inductive element (namely, a third inductor 260), and a second capacitor 265. The power switches 300 and 250 and various sensors also have the same configuration discussed previously with reference to FIG. 4. Also as discussed above, while FIG. 7 illustrates a representative embodiment with selected sensor locations, implementations, and configurations as shown, those having skill in the electronic arts will recognize that there are innumerable other sensor locations, implementations, and configurations, any and all of which are considered equivalent and within the scope of the present disclosure.

With regard to the first converter stage 510, the rectifier 350 and first sensor 220 are configured and function as previously discussed. The positive side of $V_{IN}$ 355 is coupled to a first terminal of first inductor 460, a first terminal of first sense resistor 225, and the cathode of first diode 455. A second terminal of first inductor 460 is coupled to the positive terminal of first capacitor 465, the cathode of second diode 475, and the drain of second power switch 250. The negative terminal of first capacitor 465 is coupled to the anode of first diode 455, a first terminal of second inductor 470, and a first terminal of the primary side of first transformer 360. A second terminal of second inductor 470 is coupled to the drain of first power switch 300 and the anode of second diode 475. The source of first power switch 300 is coupled to a first terminal of third sense resistor 295 and to input 292 of controller 500. The remaining portions of apparatus 505 are configured as previously discussed with reference to FIG. 4.

In this representative embodiment of the disclosure, power switches 300 and 250 are also synchronized so that they turn off and on at substantially the same time. When first power switch 300 is on (for the duration $t_{ON}$), current from the positive side of $V_{IN}$ 355 flows through the first inductor 460, first capacitor 465, second inductor 470, through first power switch 300, through third sense resistor 295, and back to the negative side of $V_{IN}$ 355, transferring energy from $V_{IN}$ 355 to first inductor 460, first capacitor 465, and second inductor 470. During the same time interval $t_{ON}$, second power switch 250 is on, such that first capacitor 465 discharges through second power switch 250 and third inductor 260, storing energy in third inductor 260 and charging second capacitor 265. When first power switch 300 and second power switch 250 are off (for the duration $t_{OFF}$), first inductor 460 and second inductor 470 discharge into first capacitor 465 and third inductor 260 discharges through third diode 255 into second capacitor 265. Regardless of whether the switches 250 and 300 are on or off, power to the load (in this example, LED array 270) is provided from either or both second capacitor 265 and/or third inductor 260, depending on where the controller is in the switching cycle.

It is to be understood herein that first power switch 300 and second power switch 250 may be implemented as any type of power switch, in addition to the illustrated N-channel MOSFET, including, without limitation, a bipolar junction transistor, an insulated-gate bipolar transistor, a P-channel MOSFET, a relay or other mechanical switch, a vacuum tube, various enhancement or depletion mode FETs, etc., and that a plurality of power switches may be utilized in the circuitry. In a representative embodiment, these switches are turned on and off substantially or approximately at the same time and for the same duration, but these switching times and durations may be different and varied equivalently within the scope of the present disclosure. It is also to be understood that LED array 270 is illustratively shown as a string of one or more LEDs; however, LED array 270 may comprise one or more strings, each string comprising one or more LEDs, connected in parallel or in another arrangement. Although in a representative embodiment the switching power converter drives one or more LEDs, the converter is also suitable for driving other linear and nonlinear loads such as computer or telephone equipment, lighting systems, radio transmitters and receivers, telephones, computer displays, motors, heaters, etc. For convenience in identifying terminals, capacitors are shown and described in illustrations and descriptions of representative embodiments of the present disclosure as polarized; however, the capacitors may be polarized or non-polarized.

It is also to be understood that controller 500 may have other or additional outputs and inputs to those described and illustrated herein, and all such variations are considered equivalent and within the scope of the present disclosure. Similarly, not all inputs and outputs for controller 500 may be utilized for a given embodiment of the present disclosure. For example, since at least one purpose of the various sense resistors is to provide input to controller 500, if some inputs are not utilized, then the corresponding sense resistors may be unused, in which case the unused sense resistors may optionally be eliminated. It should be noted that sensors may be inserted into circuits in a plurality of locations and configurations, using a plurality of methods, that the various sensors may be embodied in a wide number of ways, and that all such embodiments are considered equivalent and within the scope of the present disclosure. The illustrative embodiments shown herein describe flyback transformers without voltage snubbers; however, snubber circuits may be added to the flyback transformers, as desired.

FIG. 8A, FIG. 8B, FIG. 8C, and FIG. 8D are graphical diagrams illustrating representative inductor current waveforms and control signals in accordance with the teachings of the present disclosure, using a first stage having a flyback configuration (first transformer 230 in FIG. 4, FIG. 5, and FIG. 6). In FIGS. 8A-8D, the vertical axes represent current "I" and the horizontal axes represent time, denoted by "t". It should be understood that the illustrations represent an ideal case for purposes of explication and should not be regarded as limiting, and that actual measurements in practice may and likely will deviate from these representations. First transformer 230 has a primary inductance $L_p$. The inductance reflected to the secondary side is ideally $L_s$ $(N_s/N_p)^2 * L_p$, where $N_p$ is the number of primary windings and $N_s$ is the number of secondary windings. The secondary side of first transformer 230 has a first terminal connected to the anode of first diode 240 and a second terminal connected to first capacitor 245. In one embodiment, first transformer 230 is wound so that current flows from anode to cathode in first diode 240 when first power switch 300 is off. Variations of the topology, however, including methods of winding transformers and making corresponding alterations to the circuitry, can be made by those skilled in the art. In an alternative embodiment, first transformer 230 is wound such that current flows in the opposite direction when first power switch 300 is on. In this alternative embodiment, first diode 240, as well as one or more switches and other components, are placed in the reverse direction, e.g., with anode and cathode switched.

Figure 8A:
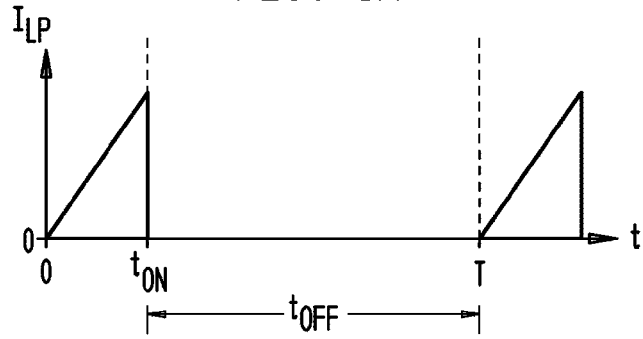
FIG. 8A, FIG. 8B, FIG. 8C, and FIG. 8D are graphical diagrams illustrating representative inductor current waveforms and control signals in accordance with the teachings of the present disclosure.
Figure 8B:
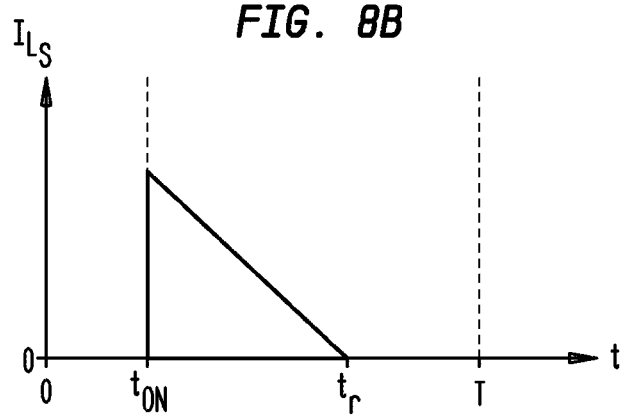
Figure 8C:
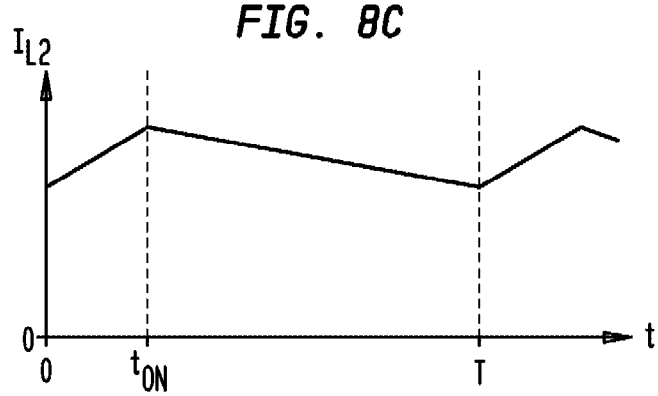

In a representative embodiment of the present disclosure, it is advantageous to have a comparatively or relatively high power factor, as presented to input power source $V_{AC}$ 345. One method of increasing the power factor is to drive the first transformer 230 in the first stage in discontinuous conduction mode (DCM). In a representative embodiment of the present disclosure and as illustrated in the waveforms shown in FIGS. 8A-8D, the first converter stage is operated in DCM (FIGS. 8A and 8B), while the second stage is operated in continuous conduction mode (CCM) (FIG. 8C). When first power switch 300 is on, primary inductor current $I_{Lp}$ flows through the primary side of first transformer 230 and into the drain of first power switch 300, as illustrated in FIG. 8A. First diode 240 connected on the secondary side is off and non-conducting. Switches 300 and 250 share common driving signals from controller 500, so second power switch 250 is also on and current $I_{L2}$ flows from the first capacitor 245 into inductor 260, then into second capacitor 265 and LED array 270. Second diode 255 is off. During this period of time, $t_{ON}$, the first transformer 230 is storing energy. At the end of the interval $t_{ON}$, switches 300 and 250 turn off and remain off for time interval $t_{OFF}$, where the switching period $T=t_{ON}+t_{OFF}$ is the sum of the on-time duration $t_{ON}$ and the off-time duration $t_{OFF}$.

When first power switch 300 turns off, the primary current $I_{Lp}$ becomes substantially zero, and energy is released from first transformer 230 through the secondary side. The secondary current through first transformer 230, denoted as $I_{Ls}$, decreases from its peak value to substantially zero at time $t_r$, where $t_r$ is the reset time, as illustrated in FIG. 8B. Prior to $t_r$, first diode 240 conducts and second power switch 250 is off. In this period of time, $t_{on} < t < t_r$, the secondary current $I_{Ls}$ charges first capacitor 245, and current from inductor 260 (current $I_{L2}$), which is decreasing as shown in FIG. 8C, is provided to second capacitor 265 and LED array 270. At time $t=t_r$, the secondary current $I_{Ls}$ through the secondary side of first transformer 230 substantially reaches zero and first diode 240 turns off. The circuit remains in this configuration until the driving signal turns on switches 300 and 250 again at time T, and the process repeats.

Since the second stage is in CCM, second inductor current $I_{L2}$ does not reach zero during a switching cycle, as shown in FIG. 8C. A benefit of keeping the buck second stage in continuous conduction mode is that this allows a comparative reduction in the capacitance values of the second stage capacitors, by reducing peak-to-peak current ripple in inductor 260. The choice of the peak-to-peak inductor 260 ripple becomes a design consideration that can be selected by the designer by adjusting switching period T and the value of inductor 260.

Figure 9A:
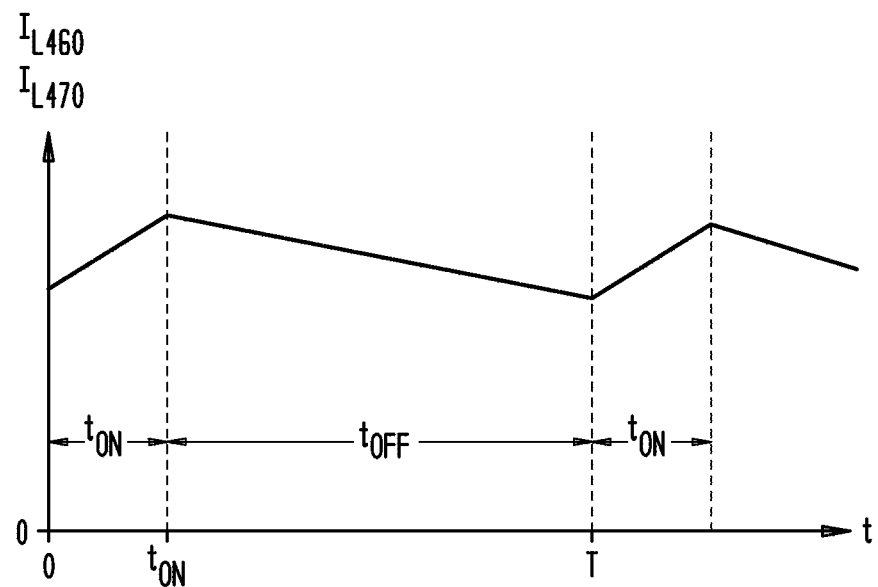
FIG. 9A and FIG. 9B are graphical diagrams illustrating representative inductor current waveforms in accordance with the teachings of the present disclosure.
Figure 9B:
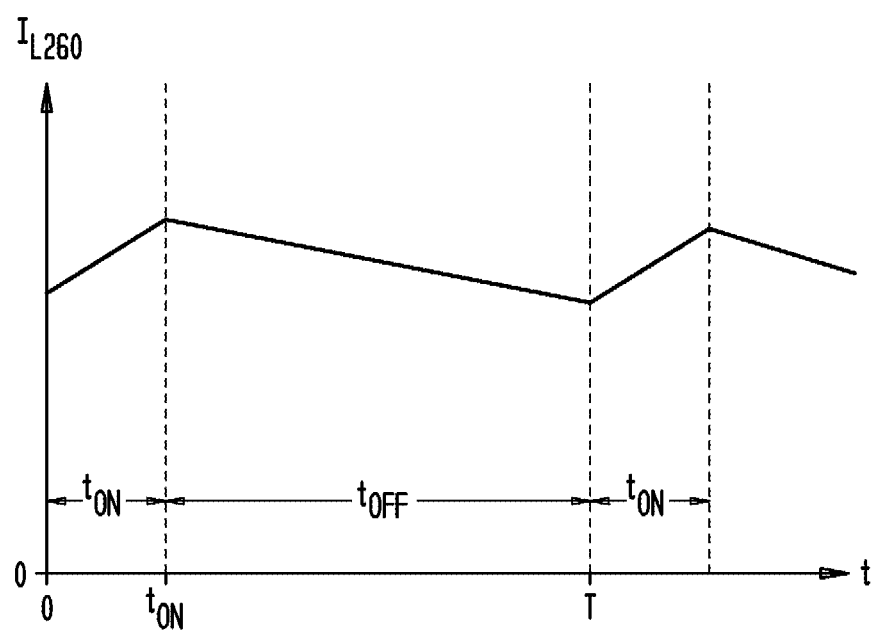

FIG. 9A and FIG. 9B are graphical diagrams illustrating representative inductor current waveforms in accordance with the teachings of the present disclosure, and more particularly of inductor currents in the representative embodiment shown in FIG. 7. It should be understood that that the illustrations represent an ideal case for purposes of explication and should not be regarded as limiting, and that actual measurements in practice may and likely will deviate from these representations. First power switch 300 and second power switch 250 are turned on at the beginning of a switching cycle by controller 500. With first power switch 300 on, current flows through first inductor 460, first capacitor 465, and second inductor 470. Current $I_{L460}$ through first inductor 460 and current $I_{L470}$ through second inductor 470 are substantially or effectively identical and are illustrated as such in FIG. 9A. While first power switch 300 is on for the interval $t_{ON}$, $I_{L460}$ and $I_{L470}$ increase. While second power switch 250 is on (also for the interval $t_{ON}$), first capacitor 465 discharges into third inductor 260, storing energy in third inductor 260 and second capacitor 265 and supplying power to LED array 270. While second power switch 250 is on, current $I_{L260}$ through third inductor 260 increases as shown in FIG. 9B. At the end of the interval$_{ON}$, first power switch 300 and second power switch 250 are turned off by the controller 500 and remain off until the end of the current switching cycle at T. With first power switch 300 off for the duration $t_{OFF}$, first inductor 460 and second inductor 470 discharge into first capacitor 465 (with second diode 475 being forward biased). With second power switch 250 off (also for the duration $t_{OFF}$), third inductor 260 discharges into second capacitor 265 and LED array 270. As third inductor 260 discharges, current$_{L260}$ in third inductor 260 decreases as shown in FIG. 9B, starting at the end of the interval $t_{ON}$ and continuing to the end of duration $t_{OFF}$ (and commencement of the next switching cycle at T).

As mentioned above, cascaded converters are very difficult to implement and control, largely due to voltage stress on the switch of the first converter stage (e.g., first switch 300), and voltage stress on a flyback diode (e.g., diode 240) when the first converter stage has a flyback configuration. In addition, such voltage stress is also highly significant even in a single stage converter. For example, switches which could tolerate high voltages (e.g., IGBTs) are insufficiently responsive and too slow to be utilized in these configurations, and MOSFETs typically are not fabricated to withstand these high voltage stresses. The representative embodiments of the present disclosure bring several discoveries to bear to implement and control these various multi-stage, cascaded converter embodiments discussed above, while simultaneously avoiding high-voltage stresses and thereby providing actual devices which are capable of being implemented using currently available components. More particularly, in the various representative embodiments, the switching duty ratio is maintained within predetermined limits or, in some embodiments, is maintained substantially constant. In addition, a switching period is selected which can accommodate both a wide range of input voltages, such as both U.S. and European AC voltage levels, and which can provide control over output current, which additionally accommodates variations in the load, such as variations in LED parameters due to temperature, aging, and other effects.

For ease of explanation, the circuit topology of FIG. 4 will be utilized in the following discussion, with the understanding that the derived control methodology of the representative embodiments is applicable to any multi-stage converter, and is not limited to those specifically illustrated herein. As mentioned above, controlling the first converter stage 210 to be in discontinuous conduction mode (DCM) provides a significant benefit, among others, in that the power factor is close to unity. A large turns ratio Np/Ns, where Np is the number of primary turns and Ns is the number of secondary turns in first transformer 230, serves to keep the first stage in DCM. Operating the first stage 210 in DCM allows the reset time to be sufficient for the flyback magnetizing current to reach substantially zero after the first switch 300 turns off. Increasing the turns ratio Np/Ns, however, has the undesirable effect of increasing the voltage stress of the first stage switch (switch 300).

It is also desirable for the multi-stage converter to be capable of operating across a range of input voltages, for example, to be useable in the U.S. and other countries. In one example of a specification for a universal input power factor correction circuit, the source input $V_{AC}$ 345 may range from 90 V RMS to 264 V RMS. One of the novel discoveries utilized in the representative embodiments concerns tight control over any changes in the duty ratio "D," with other forms of control utilized to maintain a steady output current across a range of input voltages. For this discussion, "$D_{max}$" is the maximum allowable duty ratio and "$D_{min}$" is the minimum duty ratio which may be specified or otherwise predetermined. For high values of $D_{max}$, a high turns ratio Np/Ns is used to keep the first converter stage in DCM, which in turn causes high voltage stress across first switch 300, as mentioned above. For example, with the input voltage range mentioned above, if Dmax is set at 0.85, the corresponding turns ratio of Np/Ns that will keep the first stage in DCM is seven or greater, which creates primary voltage stress across first switch 300 of around 2.5 kV, which is generally unacceptable for any type of MOSFET power switch. Conversely, making Dmax comparatively small (which also keeps Dmin small) increases voltage stress on the second stage (215A, 215B) switches and diodes (e.g., second switch 250 and second diode 255). Since high-voltage switches are expensive and have other undesirable characteristics such as low efficiency and lack of responsiveness, it is desirable to keep the voltage stress on all the switches as low as reasonably possible for a selected converter configuration.

The representative embodiments, therefore, utilize a very different control methodology, namely, changing the switching frequency (switching period "T") in response to changes in the output (load) current, such as those due to temperature fluctuations, aging, and so on, and in response to changes in input voltage (or to accommodate a wide range of input voltages). With these changes in switching period, the duty ratio (duty cycle) is maintained within a predetermined range or, in some embodiments, is maintained substantially constant at a predetermined level. In this way, a duty ratio may be predetermined which, when implemented, does not cause undue voltage stress across the first and second stage components, while simultaneously allowing a substantially high power factor (e.g., close to unity), and further providing for accommodation of a wide range of input voltages. For example, a duty ratio may be selected of about 0.5 (or within a range of 0.45 to 0.55, also for example), resulting in a first stage switch stress of about 800-900 V, which is well within switch specifications (which may be further reduced using a suitable snubber circuit), and which may be utilized with an input voltage range of 90 V RMS to 264 V RMS, for example.

Figure 10:
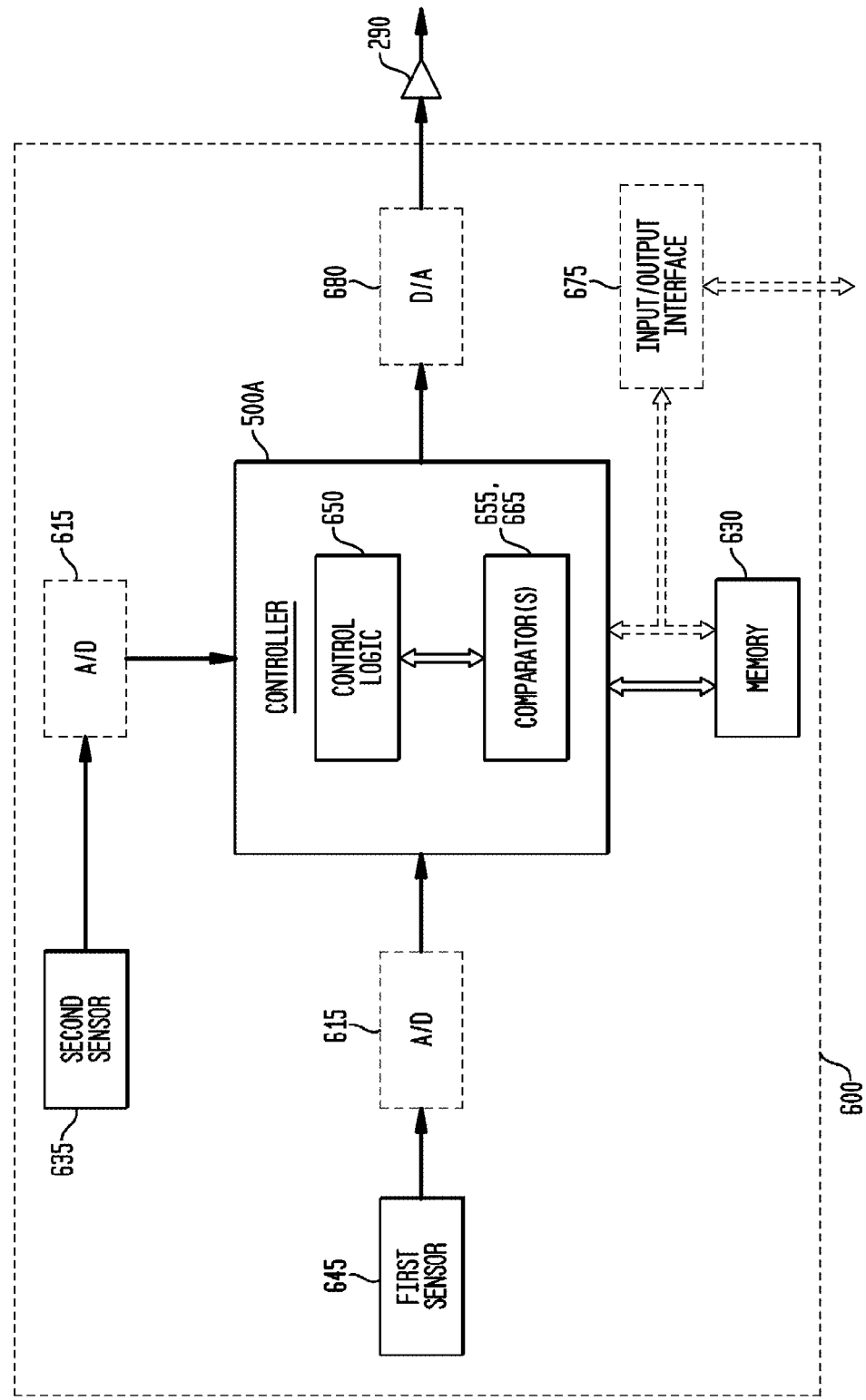
FIG. 10 is a block diagram illustrating a representative regulator in accordance with the teachings of the present disclosure.

FIG. 10 is a block and circuit diagram illustrating a representative regulator 600 in accordance with the teachings of the present disclosure. As illustrated, the regulator 600 comprises a controller 500A and a plurality of sensors, illustrated as a first sensor 645 for sensing a first circuit parameter and a second sensor 635 for sensing a second circuit parameter. For example, first sensor 645 may be an input voltage sensor which may be implemented in a plurality of ways to determine the first circuit parameter, such as a voltage level, including as first sensor 220, which provides an average input voltage level. Also for example, the first parameter may be $V_{IN}$ 355, $V_{IN\_AVG}$ as discussed above, the root mean square of $V_{IN}$ 355 (or $V_{AC}$ 345) (referred to herein as "$V_{IN\_RMS}$"), or other derivations of the input voltage. Similarly, the second sensor 635 may be an output current sensor, and may be implemented as a sensor 485 (e.g., a sense resistor) couplable to the load (e.g., LED array 270) for sensing a second parameter, in this case the output current through the load, or may sense another circuit parameter which may be proportional or otherwise related to the output current, such as by using the second sensor 325. Not separately illustrated is any clocking circuitry which may be utilized, e.g., clock, oscillator, etc.

The controller 500A may be implemented in a wide variety of ways, as discussed in greater detail below, following the discussion of FIG. 15. As illustrated, the controller 500A comprises control logic 650 and one or more comparators 655 and/or 665 and, optionally, may include other components as discussed below. The control logic 650 may comprise any type of analog or digital circuitry for use in performing any of the various determinations or calculations described herein, such as one or more adders, multipliers, finite state machines, etc., or otherwise used in performing the various methodologies of the present disclosure, and further may be embodied or implemented generally as described in greater detail below for a controller 500, such as a processor, FPGA, ASIC, finite state machine, etc. Comparators 655 and/or 665 are utilized to compare a value of a sensed parameter with a predetermined, selected, or calculated value, for use in determining the switching period or duty cycle, as discussed in greater detail below. Optionally in selected embodiments, when the controller 500A is implemented in digital form, analog-to-digital converters ("A/D") 615 may also be utilized to convert analog signals from the first and second sensors 645, 635 to a digital counterpart suitable for use by the controller 500A, with at least one digital-to-analog converter ("D/A") 680 then also utilized in this selected embodiment to convert digital signals from the controller 500A to an analog counterpart suitable for use for driving the gates of the power switches 300, 250 and any intervening driver circuitry (290, 305, 306). As mentioned above, the controller 500A may have any number of inputs and outputs and, as illustrated, also receives input from a memory 630, which may be any type or kind of memory circuit, also as discussed in greater detail below. Also optionally in selected embodiments, an input-output ("I/O") interface 675 may also be included within regulator 600, such as for programming or configuring the controller 500A and/or for storing information in the memory 630, such as threshold values or a look-up table, for example and without limitation. An output of the controller 500A is coupled to one or more drivers 290 or other form of gate drivers 305 or 306, for effective switching of the first and second power switches 300, 250.

Also for example, in a representative embodiment, the first parameter from first sensor 645 is an input voltage so that an output from the first sensor 645, e.g., $V_{INPUT}$, is an indicator or otherwise represents the input voltage $V_{IN}$ 355. Similarly, in a representative embodiment, the second parameter is an output current so that the output from the second sensor 635, e.g., $I_{LOAD}$, is an indicator or otherwise represents the load current in this case. As indicated above, other circuit parameters may also be determined which may also be significant and which may be utilized for the desired or selected regulation. For example, a sensed circuit parameter is considered to represent the load current if it is related to the output current directly enough that regulating that selected parameter will satisfactorily regulate the output current for the selected application or tolerance. For example, a sensed current through the second inductive element (current$_{L2}$) may be utilized as an indicator of the load current. Continuing with the example, the output from the second sensor 635 ($I_{LOAD}$) may be a rational multiple/fraction of the output load current or it may be a parameter that is approximately or substantially proportional or otherwise related to the output load current, and similarly the output from the first sensor 645 ($V_{INPUT}$) may be a rational multiple/fraction of the input voltage or it may be a parameter that is approximately proportional or otherwise related to the input voltage. For example, sensed value $I_{LOAD}$ output from second sensor 635 may be or represent $I_{LED}$ from FIG. 4, 5, or 7; the current through or voltages across resistors (or sensors) 435, 440, 445, or 295 from FIG. 6; second inductive element current $I_{L2}$; or another parameter that represents load current. It is to be noted that the sensed parameter may be a voltage, even though the parameter represents a current, for example, and vice-versa. It should also be noted that output current may, in some cases, be measured and, in other cases, be determined in other ways. For example, in FIGS. 4, 5, and 7, a sensor is illustratively positioned to measure current in the second power switch 250. This current is approximately equal to the current of second inductive element 260 while power switch 250 is closed and may be used to compare to the upper threshold $I_{MAX}$ (explained below). While power switch 250 is open, other methods may be used to determine or estimate inductor current, for example, the method described in Dongsheng Zhou et al., U.S. Pat. No. 7,880,400, filed Sep. 21, 2007, entitled "Digital Driver Apparatus, Method And System For Solid State Lighting" (the "Zhou application"), incorporated herein by reference with the same full force and effect as if set forth in its entirety herein. In addition, there are many methods for converting a current measurement into a voltage measurement (and vice-versa), one representative method utilizing a sense resistor, optionally followed by an amplifier, for example.

There are several control methodologies within the scope of the present disclosure, and all serve to determine and/or vary a switching period (equivalently, switching frequency) of the multi-stage converter. In a first method, average load or output current is also regulated using hysteretic control, using minimum and maximum values for load/output current. In this first method, the controller 500A turns the switches off when the measured parameter reaches (e.g., has increased to) the maximum threshold, and turns the switches on when the measured parameter reaches (e.g., has decreased to) the minimum threshold. The maximum and minimum thresholds may be predetermined (and, for example, stored in memory 630), or may be determined by the controller 500A, such as based on another parameter, such as input voltage. Accordingly, setting or determining the maximum and minimum thresholds correspondingly affects the switching frequency, such that if the maximum and minimum thresholds (bounds) are comparatively far apart, the switching frequency is decreased, and if the maximum and minimum thresholds (bounds) are comparatively close, the switching frequency is increased. In this first method, the duty cycle (duty ratio) is maintained within a predetermined range (or substantially constant).

In a second method, the controller 500A utilizes a sensed input voltage to determine the switching period, and then utilizes feedback from the output or load current to provide more precise or fine-grained regulation of the output current, while also maintaining the duty cycle (duty ratio) within a predetermined range (or substantially constant).

Figure 11A:
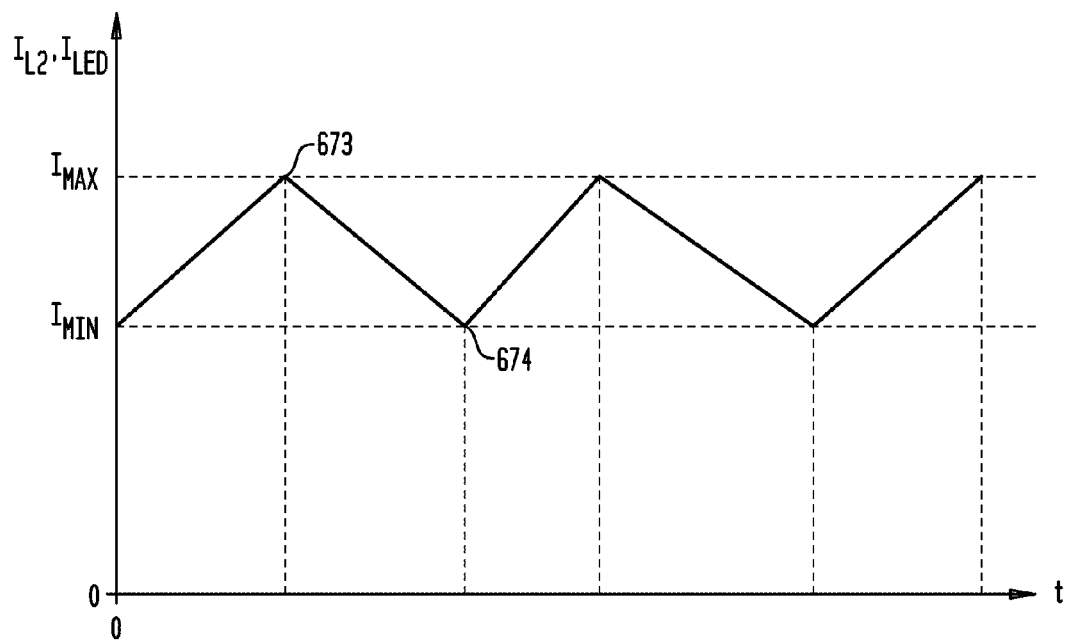
FIG. 11A and FIG. 11B are graphical diagrams respectively illustrating representative inductor current (or output current) and control signal waveforms in accordance with the teachings of the present disclosure.
Figure 11B:
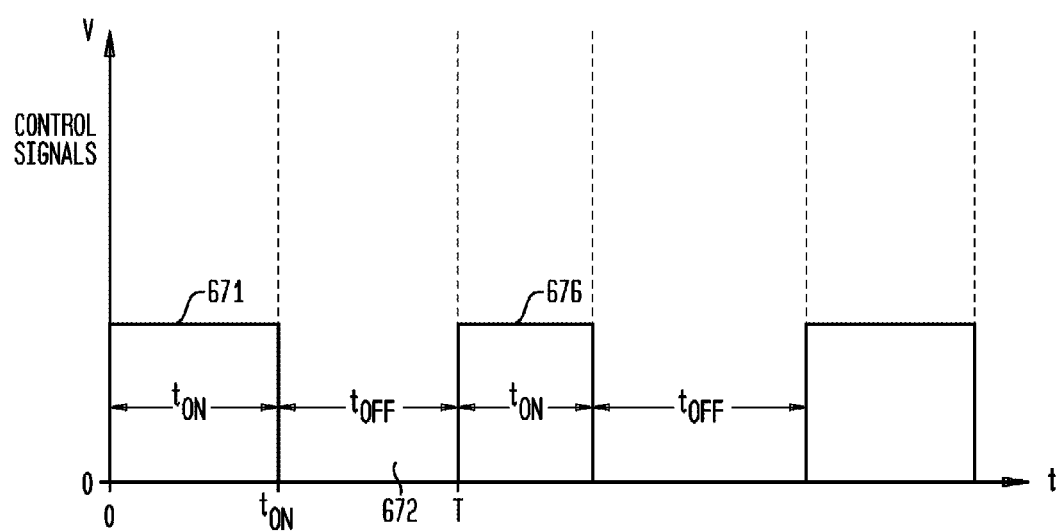

This first method is illustrated graphically in FIG. 11A and FIG. 11B, which are graphical diagrams respectively illustrating representative inductor current and/or output current (FIG. 11A) and control signal (FIG. 11B) waveforms in accordance with the teachings of the present disclosure. It should be noted that the current $I_{L2}$ through second inductive element (for example, inductor 260, or more generally, the power-carrying inductive element in the second stage of the power converter, and which may be denoted as "$L_2$") is, on average, substantially proportional or otherwise related to the current $I_{LED}$ through the load (LEDs 270). In accordance with representative embodiments, by controlling $I_{L2}$, the controller 500A also controls the output current, in this case $I_{LED}$. Therefore, in a representative embodiment of the present disclosure, inductor current of the second stage $I_{L2}$ is sensed by the second sensor 635, with resulting values utilized by the controller 500A to control the output current. As illustrated in FIGS. 11A and 11B, when the power switches 300, 250 are turned on by the controller 500A (interval $t_{ON}$ 671), the current (second inductive element current or load current) will increase. When the current (second inductive element current or load current) has increased substantially to a first threshold (illustrated as "$I_{MAX}$" 673), the controller 500A turns the power switches 300, 250 into an off state (non-conducting) (interval $t_{OFF}$ 672), at which point the current (second inductive element current or load current) will decrease. When the current (second inductive element current or load current) has decreased substantially to a second threshold (illustrated as "$I_{MIN}$" 674), the controller 500A turns the power switches 300, 250 into an on state (conducting 676), at which point the current (second inductive element current or load current) will increase again, and the process repeats.

From the above description, it is apparent that the switching period T, the average value of inductor current $I_{L2}$, the average value of output current $I_{LED}$, and the output ripple depend on values chosen for first and second thresholds $I_{MAX}$ and $I_{MIN}$. In a representative embodiment, these first and second thresholds are determined by the controller 500A in response to a sensed input voltage, using $V_{INPUT}$ from first sensor 645, for example. This may be a computation using, for example, control logic within the controller 500A. In another representative embodiment, using a sensed parameter such as the input voltage, the controller 500A accesses a look-up table (LUT) stored in the memory 630, and reads corresponding stored (and predetermined) values to determine first and second thresholds $I_{MAX}$ and $I_{MIN}$.

The values for the first and second thresholds $I_{MAX}$ and $I_{MIN}$ may be determined by the controller (e.g., computed, read from memory, or otherwise determined) using a wide variety of input information, which may be sensed or stored in memory, including without limitation:

1. $V_{LOW\_RMS}$—The minimum RMS (root mean square) voltage expected for $V_{IN}$ 355 (or $V_{AC}$ 345);
2. $V_{HIGH\_RMS}$—The maximum RMS (root mean square) voltage expected for $V_{IN}$ 355 (or $V_{AC}$ 345);
3. $\Delta I_{L2}$ (or $\Delta I_{LED}$)—The selected or desired amount of ripple current for second inductive element $L_2$ or the output current $I_{LED}$, which determines the amount of allowable variance of the current from an average value (i.e., how far above and below the average value $I_{L2}$ is allowed to vary);
4. $T_{MAX}$—The maximum desired switching period;
5. $T_{MIN}$—The minimum desired switching period; and/or
6. $I_{REF}$—The desired average load current (such as the current through LED array 270).

In a first representative embodiment of controller 500A and regulator 600, $I_{MAX}$ and $I_{MIN}$ are set to (Equation 1):

$$I_{MAX} \approx I_{REF} + (\Delta I_{L2} * V^2_{LOW\_RMS} / 2 * V^2_{IN\_RMS}),$$

and (Equation 2):

$$I_{MIN} \approx I_{REF} - (\Delta I_{L2} * V^2_{LOW\_RMS} / 2 * V^2_{IN\_RMS}),$$

in which $V_{IN\_RMS}$ is the RMS voltage of $V_{IN}$ 355 (or $V_{AC}$ 345). Similar equations may be derived using values for $V_{HIGH\_RMS}$ or other parameters. It should be noted that the first and second thresholds $I_{MAX}$ and $I_{MIN}$ are determined based on a sensed value for an input voltage, an allowable amount of variance in output (and/or second inductive element) current, and an expected or predetermined minimum or maximum input voltage level (which may be an RMS or other value). Since it may be convenient to scale one or more of $I_{REF}$, $I_{MIN}$, or $I_{MAX}$, we can replace the substantially equal to signs ("$\approx$") in Equations 1 and 2 with a proportional relationship ("$\propto$"), or with a strict equality ("="), or more generally as "substantially related to." The computations may be simplified by first computing an offset term (the portion of Equations 1 and 2 in parenthesis), then adding the offset term to $I_{REF}$ to obtain $I_{MAX}$ and subtracting the offset term from $I_{REF}$ to obtain $I_{MIN}$. These parameters may be utilized in a LUT in memory 630 to obtain corresponding values for the first and second thresholds $I_{MAX}$ and $I_{MIN}$.

One benefit of controlling the power converter as shown in Equations 1 and 2 is that the switching period changes in response to $I_{MAX}$ and $I_{MIN}$ to a value that holds the output current within a predetermined variance while also holding the duty ratio within a predetermined range or variance. By holding the duty ratio within a predetermined range (or substantially constant), the voltage stress is maintained below a predetermined level. Using the values determined for first and second thresholds $I_{MAX}$ and $I_{MIN}$ in Equations 1 and 2, the power converter (205, 490, 405, 505) is adapted to operate with a switching period and duty cycle that maintains voltage stress below a predetermined level.

Any given sensed parameter may be transformed into another comparable value. For example, the representative method of measuring $V_{IN\_AVG}$ using sensor 220 measures the average of $V_{IN}$, yet Equations 1 and 2 use $V_{IN\_RMS}$. There are several alternatives for obtaining a value for $V_{IN\_RMS}$ for use in Equations 1 and 2. In a representative embodiment, $V_{IN}$ is multiplied by a constant "$\alpha$" so that an estimate for $V_{IN\_RMS}$ is $V_{IN\_RMS} \approx \alpha V_{IN\_AVG}$, where $\alpha$ is chosen to compensate for the difference between average and RMS voltage and for the voltage drop across the resistive divider comprising first sense resistor 225 and second sense resistor 285. In another representative embodiment, $V_{IN}$ is used instead of $V_{IN\_RMS}$ in Equation 1. In another representative embodiment, a sensor designed to measure RMS voltage directly is added to the power converter, using circuitry as known or becomes known in the electronic arts.

Figure 12:
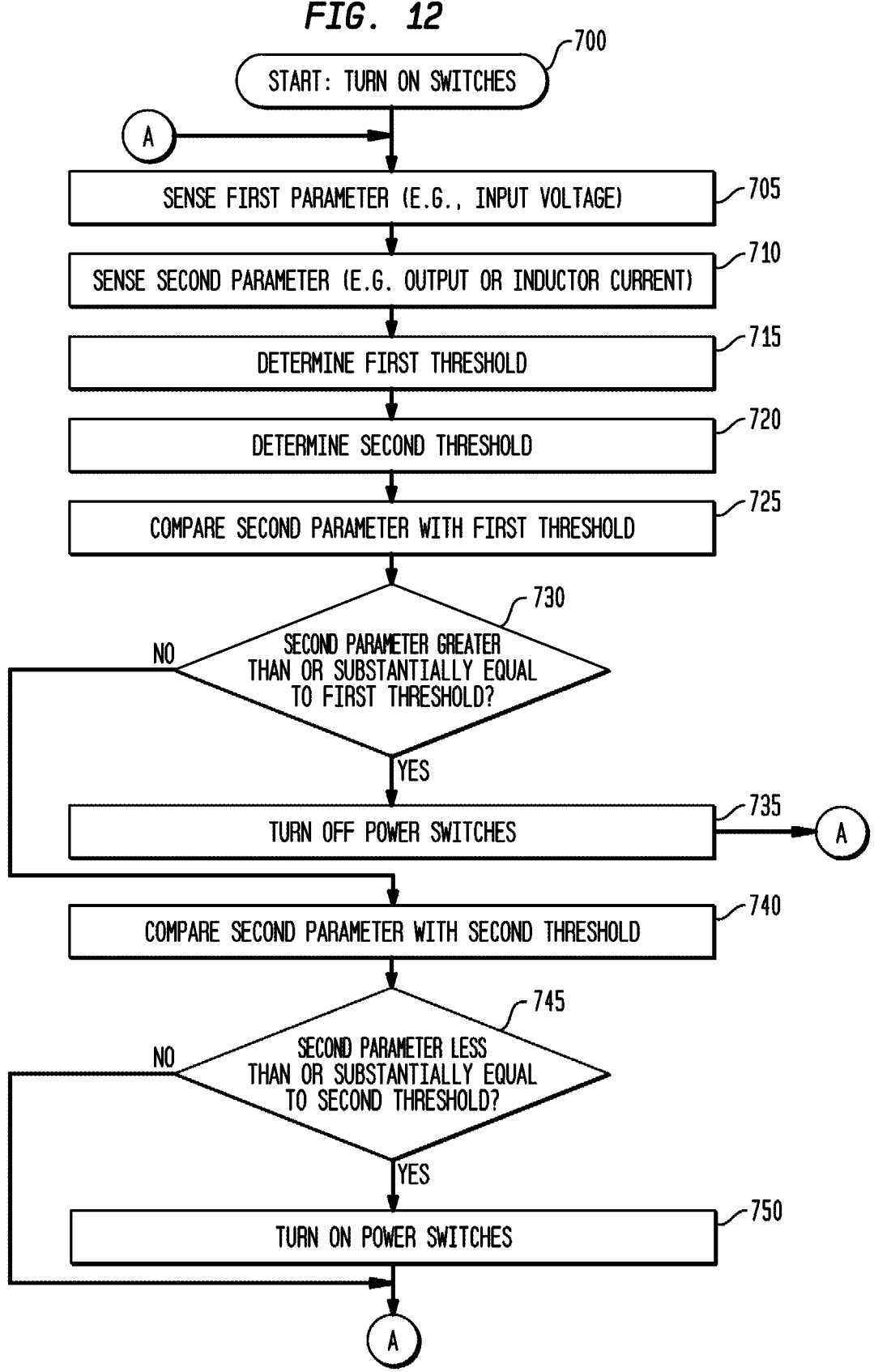
FIG. 12 is a flow diagram illustrating a first method of controlling a cascaded power converter in accordance with the teachings of the present disclosure.

FIG. 12 is a flow diagram illustrating the representative first method of controlling a cascaded power converter in accordance with the teachings of the present disclosure. As indicated above, this first method of controlling a two-stage, cascaded power converter (205, 490, 405, 505) involves a hysteretic process of regulating the output DC current by increasing or decreasing the power switches (300, 250) on-time and off-time durations in response to at least one sensed parameter, such as a first parameter (e.g., an input voltage, such as from first sensor 645), and/or a second parameter (e.g., an output (or second inductive element) current, such as from second sensor 635). Beginning with start step 700, the converter is started, with both power switches' (e.g., 300, 250) turned into an "on" state. In step 705, a first parameter is determined, such as a voltage value representing RMS input voltage, or an approximation from the average input voltage, or another similar metric as discussed above. In step 710, a second parameter is determined, such as an output current level or second inductive element current level. Typically, the first and second parameters will be measured continuously or periodically (e.g., sampled), for as long as the converter is in operation, for ongoing use in a plurality of comparison steps. In step 715, a first, upper threshold is determined (e.g., $I_{MAX}$), and in step 720, a second, lower threshold is determined (e.g., $I_{MIN}$), such as through accessing a memory 630 or a calculation by the controller 500A. The value of the second parameter is compared with the first, upper threshold, step 725. When the value of the second parameter is greater than or substantially equal to the first, upper threshold, step 730, the method proceeds to step 735, and the power switches (300, 250) are turned into an off, non-conducting state (by the controller 500A and any intervening drivers). When the value of the second parameter is not greater than or substantially equal to the first, upper threshold in step 730, the method then compares the value of the second parameter with the second, lower threshold, step 740. When the value of the second parameter is less than or substantially equal to the second, lower threshold, step 745, the method proceeds to step 750, and the power switches (300, 250) are turned into an on, conducting state (by the controller 500A and any intervening drivers). When the value of the second parameter is not less than or substantially equal to the second, lower threshold in step 745, indicating that the second parameter is in between the first and second thresholds, and following steps 735 and 750, the method returns to step 705, and the process repeats (until an operator switches off the input power to the converter).

It should be noted that, using this hysteretic process of current regulation, the switching period responds to the values of the upper and lower thresholds. For example, if the thresholds move closer together, the switching period will tend to become shorter. Since the upper and lower thresholds are set using the input voltage, it is apparent that the switching period is a function of, possibly along with other factors, the input voltage. It should be noted that the various operational steps of FIG. 12 may occur in a wide variety of orders, in addition to or in lieu of the order illustrated in FIG. 12. For example, the various comparison steps will typically occur concurrently, such as using the representative regulator 605 illustrated in FIG. 13.

Figure 13:
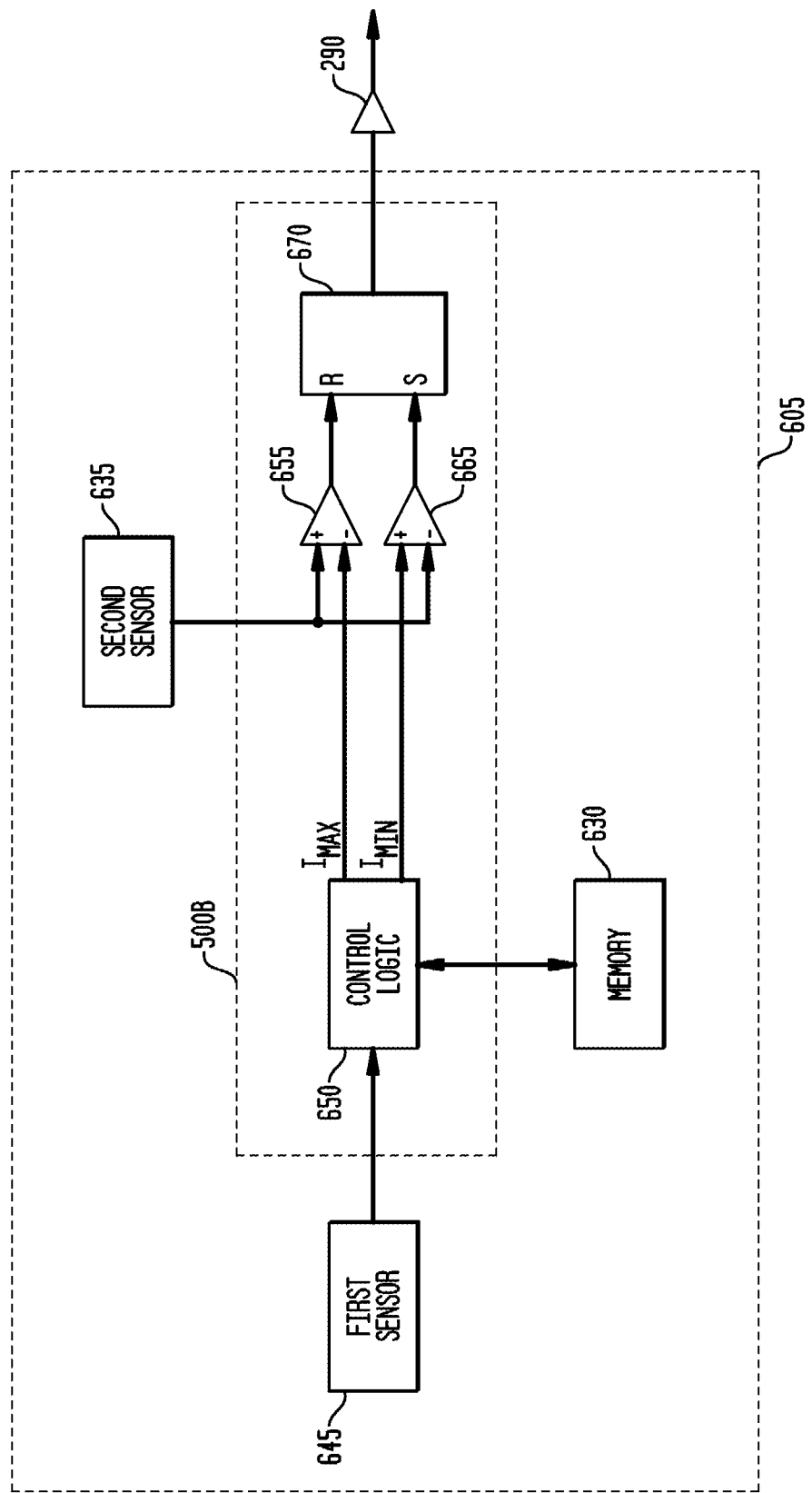
FIG. 13 is a block diagram illustrating a representative controller and a representative regulator in accordance with the teachings of the present disclosure.

FIG. 13 is a block diagram illustrating a representative controller 500B and a representative regulator 605 in accordance with the teachings of the present disclosure, which may be utilized to implement the first, hysteretic control methodology discussed above. The regulator 605 comprises controller 500B, a first (e.g., input voltage) sensor 645, and a second (e.g., output or inductor current) sensor 635. Controller 500B comprises control logic block 650, first comparator 655, second comparator 665, and flip-flop (or latch) 670, and optionally may also include memory 630 or be coupled to a separate memory 630. First sensor 645 determines a first parameter, such as any of the various input voltage levels discussed above, e.g., RMS input voltage, a scaled version of $V_{IN}$ 355, an average version of $V_{IN}$ 355, etc. Second sensor 635 determines a second parameter, such as output current or inductor 260 current, as described above. The control logic block 650 receives a value of the first parameter, such as an input voltage level, from first sensor 645 and determines the first and second thresholds $I_{MAX}$ and $I_{MIN}$, such as through a calculation (e.g., using adders, multipliers, etc., within the control logic block 650) and/or using information stored in memory 630, such as using an LUT as discussed above. The control logic block 650 provides the corresponding first and second thresholds $I_{MAX}$ and $I_{MIN}$ to the first and second comparators 655, 665, respectively, which in turn compare the sensed current level (provided by second sensor 635) to the first and second thresholds $I_{MAX}$ and $I_{MIN}$, and provide a corresponding signal to the flip-flop or latch 670. When the sensed current level is equal to or greater than the first threshold $I_{MAX}$, the output of comparator 655 goes high and resets flip-flop 670, which outputs a control signal, in this case a low (logic zero) signal, to the gate driver 290 to turn the power switches 300, 250 into an off state. When the sensed current level is equal to or less than the second threshold $I_{MIN}$, the output of comparator 665 goes high and sets flip-flop 670, which outputs a control signal, in this case a high (logic one) signal, to the gate driver 290 to turn the power switches 300, 250 into an on state.

Figure 8D:
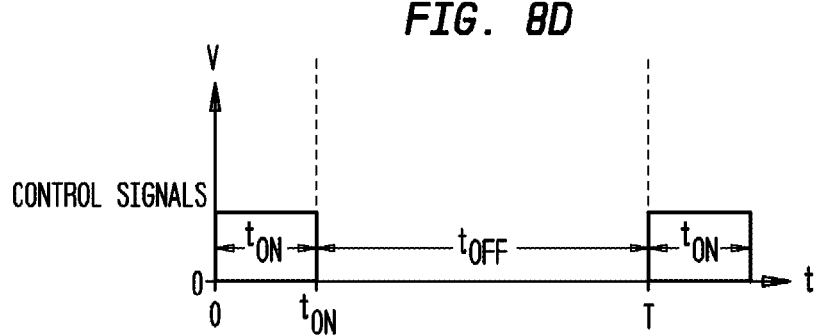

Referring again to FIG. 10, the controller 500A may also implement a second method, as mentioned above, to control the switching period (frequency) and duty cycle of the cascaded, multi-stage converter (205, 490, 405, 505). As illustrated in FIG. 8D, controller 500A generates a series of control signals (pulses) with a duty ratio of $D=t_{ON}/T$ and a switching period (cycle time) of T. The control signals control the power switches 300, 250 in the first and second power converter stages, respectively, as discussed above.

In this representative embodiment, controller 500A determines a switching period in response to a sensed input voltage (e.g., $V_{INPUT}$) (and optionally in response to other parameters). A switching period T that reduces voltage stress in the power converter is proportional or substantially equal to (Equation 3):

$$T \approx T_{MAX} * V^2_{LOW\_RMS}/V^2_{IN\_RMS} \text{ (or } T \propto T_{MAX} * V^2_{LOW\_RMS}/V^2_{IN\_RMS});$$

or, equivalently (Equation 4):

$$T \approx T_{MIN} * V^2_{HIGH\_RMS}/V^2_{IN\_RMS} \text{ (or } T \propto T_{MIN} * V^2_{HIGH\_RMS}/V^2_{IN\_RMS}).$$

The factors $T_{MAX}*V^2_{LOW\_RMS}$ and $T_{MIN}*V^2_{HIGH\_RMS}$ are theoretically equal, and these parameters may be used as a matter of convenience. Any line voltage ("$V_1$") may be utilized with acceptable switching period ($T_1$) which provides the same duty ratio as desired, such that $T_1*V^2_1 \approx T_{MAX}*V^2_{LOW} \approx T_{MIN}*V^2_{HIGH\_RMS}$. For such a more general case, $T \approx T_1*V^2_1/V^2_{IN\_RMS}$ (or $T \propto T_1*V^2_1/V^2_{IN\_RMS}$). In addition, various parameters or factors may be combined and stored in a memory 630 as a single parameter, such as storing the factor substantially equal to $T_{MIN}*V^2_{HIGH\_RMS}$, without having $T_{MIN}$ or $V_{HIGH}$ stored.

Using Equation 3 or Equation 4, the switching period is determined to be a value that maintains voltage stress below a predetermined level for a given input voltage level, allowing use of the various converters with a wide range of input voltage levels. In representative embodiments, controller 500A may determine the switching period T using analog or digital circuitry. In another representative embodiment, controller 500A determines the switching period T using a lookup table (LUT) comprising, for example, values for T with respect to $V_{IN\_RMS}$ and stored values for $V_{HIGH\_RMS}$ or $V_{LOW\_RMS}$, where the LUT is advantageously stored in a memory 630. Other methods for determining switching period T (or a corresponding switching frequency) may be used, all of which are considered essentially equivalent and within the scope of the present disclosure.

In a representative embodiment, the duty cycle D may be determined using methods known or which become known in the electronic arts to achieve desired output current, to meet reasonable electronic component specifications, and to meet other design goals. Modeling may also be performed to determine a range of duty cycles which will maintain voltage stresses within predetermined limits for corresponding component specifications (e.g., turns ratios). In another representative embodiment, D is predetermined or otherwise set to an initial value, then modified slowly in response to sensed output current (or, in the case of LEDs, optionally in response to light output) in order to correct for output drift in response to factors such as LED aging, temperature, etc. In a representative embodiment, if LED current exceeds a desired level, the controller 500A is adapted to slowly decrease (or decrement) the duty cycle D until the sensed current drops to a desired level. If the sensed current is too low, the controller 500A is adapted to slowly increase the duty ratio D until the sensed current has increased to the selected or predetermined current level. This may be accomplished by comparing the sensed current with a predetermined current level to generate a corresponding error signal, which is then utilized to increase (or increment) or decrease (or decrement) the duty cycle D, as needed, for the selected switching period or frequency. As with determination of T (above), determination of D and generation of control pulses may, within the scope of the present disclosure, use analog, digital, or any of a number of other methods that accomplish a similar result. In a representative embodiment, the selected or predetermined current level has a single value, while in another representative embodiment, the selected or predetermined current level comprises multiple values or thresholds, for example, an upper and lower bound, such as to also provide hysteretic control.

Figure 14:
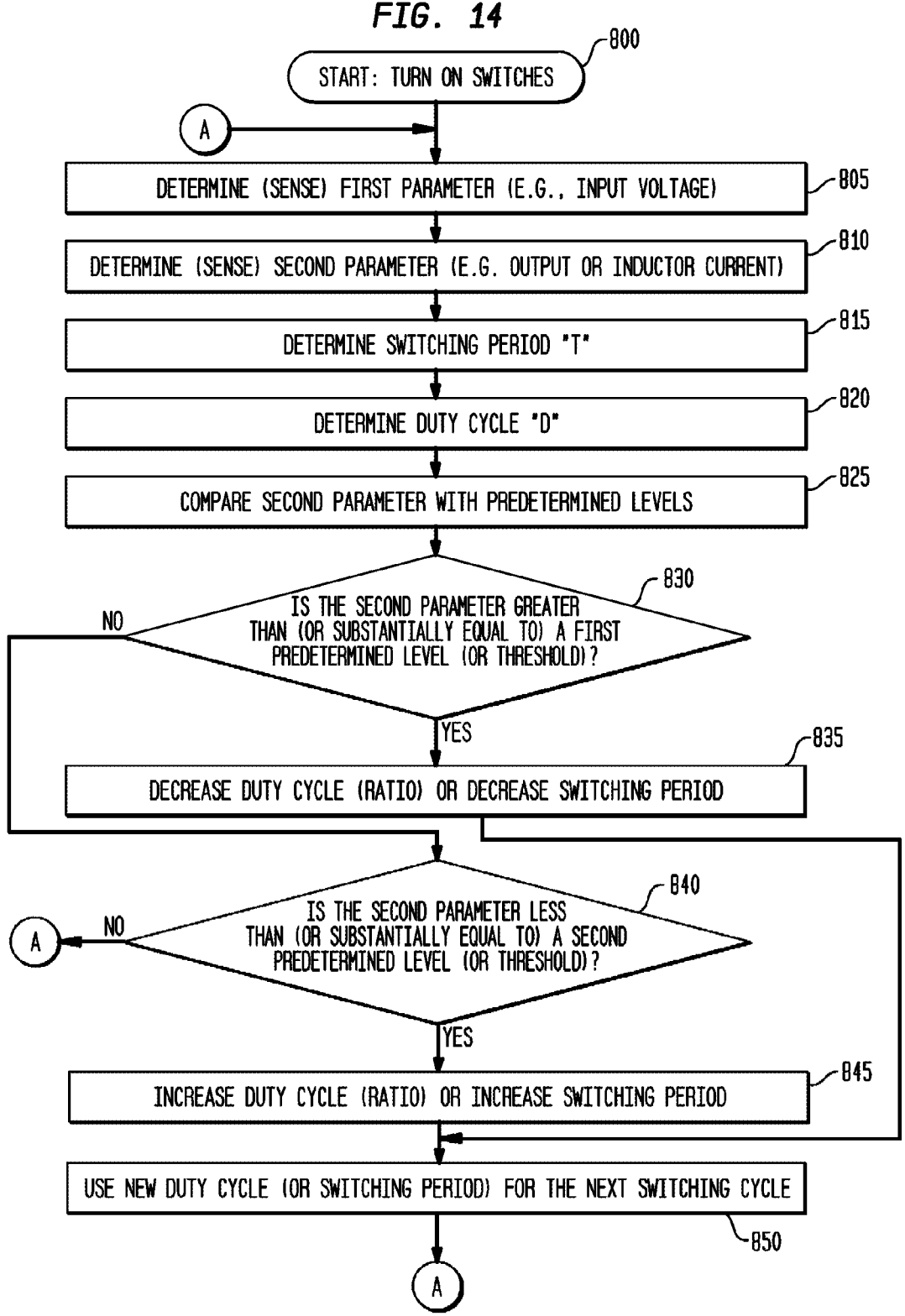
FIG. 14 is a flow diagram illustrating a second method of controlling a cascaded power converter in accordance with the teachings of the present disclosure.

FIG. 14 is a flow diagram illustrating a second method of controlling a cascaded power converter in accordance with the teachings of the present disclosure. As mentioned above, this second method of controlling a multi-stage power converter (205, 490, 405, 505) involves determining a switching period T, which is variable and adjusted or otherwise determined in response to a sensed first parameter, such as an input voltage (such as an input voltage determined by first sensor 645). Beginning with start step 800, power switches 300, 250 are turned on, and a first parameter such as the input voltage is determined, step 805, as discussed above, and as may be needed, converted or approximated to an RMS value, also as discussed above. In step 810, a second parameter may also be determined, as an option, such as an output (or inductor 260) current level. Typically, the first parameter (such as an input voltage) and second parameter (such as an output or inductor current) will be measured continuously or periodically (e.g., sampled), for as long as the converter is in operation, for ongoing use in adjusting the switching period or duty cycle, as may be desirable. In step 815, a switching period T is determined, such as by using Equations 3 or 4, or through use of a look-up table or other memory access, for example and without limitation. In step 820, a duty cycle D is determined, which as mentioned above, may be selected from a predetermined range of values or limits, may be selected as a single initial value, may be calculated or determined through use of a look-up table or other memory access, for example and without limitation. In some circumstances, the duty cycle D may also be determined based upon a sensed parameter such as the input voltage.

The controller 500A generates a series of control signals (pulses) with duty ratio (duty cycle) D and switching period T. More particularly, the on-time $t_{ON}$ of each control signal (or pulse) is a function of the duty ratio and of the switching period, as described above and as illustrated in the various figures. In step 825, the second parameter (for example, LED current, inductor current, light output, etc.) is compared to one or more selected or predetermined levels or thresholds. When the second parameter is greater than (or substantially equal to) a first selected or predetermined level in step 830, the duty cycle is decreased (slowly or slightly decremented), step 835, for use in the next switching cycle. When the second parameter is less than (or substantially equal to) a second selected or predetermined level in step 840, the duty cycle is increased (slowly or slightly incremented), step 845, also for use in the next switching cycle. As mentioned above, the first and second selected or predetermined levels may be maximum and minimum threshold values. If the first and second selected or predetermined levels are the same single value, then during steady state operation, the duty cycle is likely to converge to the single selected or predetermined level, or is likely to converge about the selected or predetermined level, e.g., will then be slightly incremented for a switching cycle, followed by slightly decremented for a next switching cycle, followed by slightly incremented for the next switching cycle, etc. In both cases, the duty cycle will generally be stably maintained at a constant value or within a predetermined range of values, and in both cases, providing for reduced voltage stress in the power switches 300, 250 and other components within the converter (205, 490, 405, 505). Following these determinations, the revised (or the same) duty cycle will be utilized in the next switching cycle, step 850, the method returns to step 805, and the process repeats (until an operator switches off the input power to the converter).

As another representative embodiment illustrated in FIG. 14, instead of varying the duty cycle in steps 835 or 845, the duty cycle may be maintained substantially constant, and the switching period T may be correspondingly decremented or incremented, with any revised or new switching period used for the next switching cycle in step 850.

As another representative embodiment not separately illustrated in FIG. 14, instead of utilizing the revised switching period T or duty cycle in the next switching cycle, a determination may be made concerning the current state of the converter (whether it is still during a $t_{ON}$ interval), and if so, the on-time duration may be varied as may be needed during the current switching cycle, with the off-time duration varied as needed for the commencement of the next switching cycle.

It should be noted that, as mentioned above, using this second process of current regulation, particularly with first and second thresholds, the switching period or the duty cycle responds to the values of the upper and lower thresholds. For example, when the duty cycle is maintained substantially constant, if the thresholds move closer together, the switching period will tend to become shorter. Since the upper and lower thresholds are set using the input voltage, it is apparent that the switching period is a function of, possibly along with other factors, the input voltage. Also, for example, when the switching period is maintained substantially constant, if the thresholds move closer together, the duty cycle will tend to become smaller. It should be noted that the various operational steps of FIG. 14 may occur in a wide variety of orders, in addition to or in lieu of the order illustrated in FIG. 14.

Figure 15:
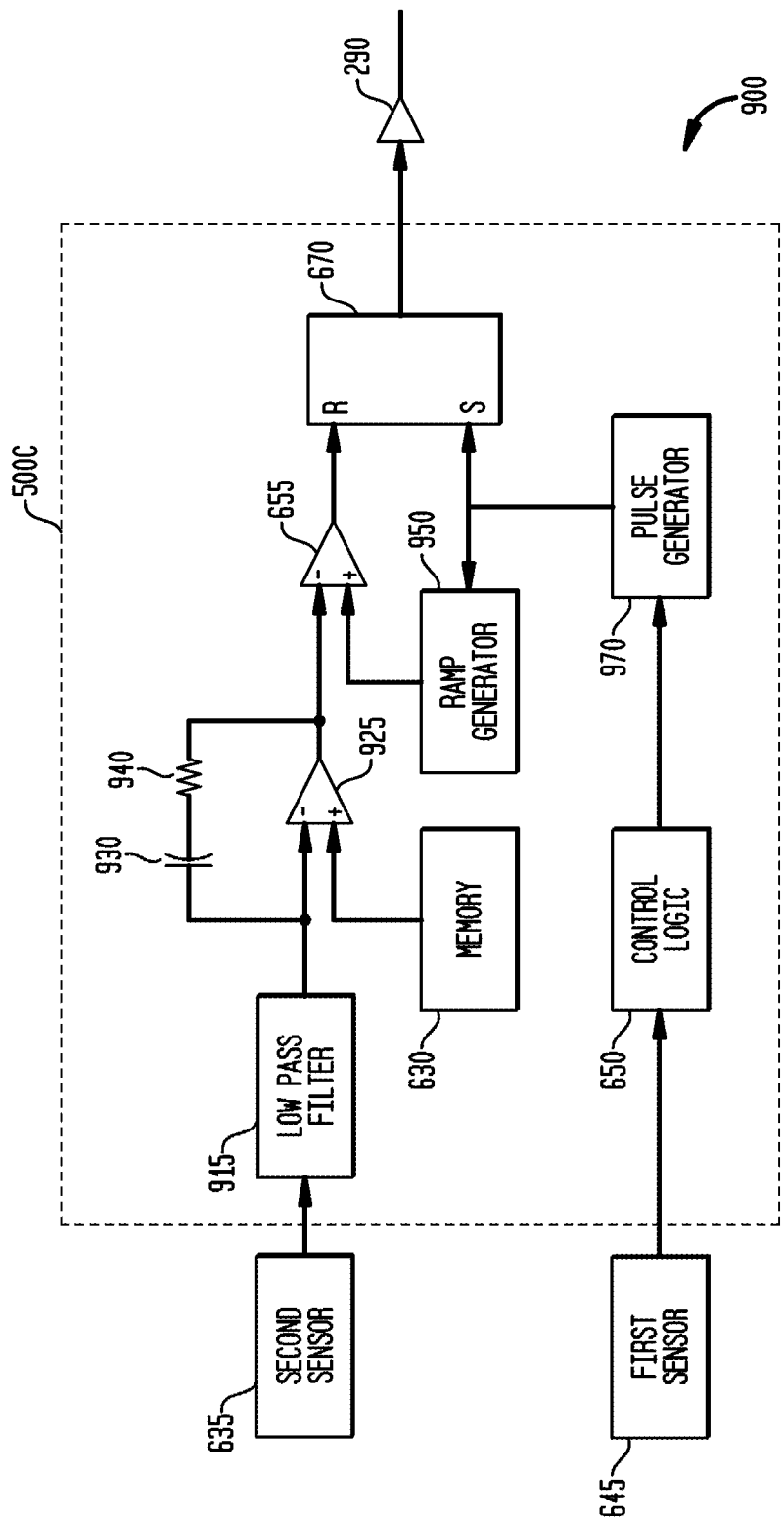
FIG. 15 is a block and circuit diagram illustrating a third representative controller and a fourth representative regulator in accordance with the teachings of the present disclosure.

FIG. 15 is a block and circuit diagram illustrating a third representative controller 500C and a fourth representative regulator 900 in accordance with the teachings of the present disclosure. The regulator 900 comprises controller 500C, first sensor 645 (e.g., an input voltage sensor), second sensor 635 (e.g., an output or inductor current sensor), and also may be considered to include gate driver circuitry (290, 305, 306). Controller 500C comprises a low pass filter 915, memory 630, capacitor 930, resistor 940, error amplifier 925, comparator 655, ramp generator 950, flip-flop (or latch) 670, control logic (block) 650, and pulse generator 970. Not separately illustrated is any clocking circuitry, as mentioned above.

The first sensor 645 and the second sensor 635 function as described above. The output of second sensor 635 is coupled to the input of low pass filter 915, such as to filter any output current ripple. A selected average output or inductor 260 current value is stored in memory 630, and may be predetermined and preloaded into memory 630 or it may be dynamically generated and stored in memory 630. The output of memory 630 is coupled to the non-inverting input of error amplifier 925. The output of the low pass filter 915 is coupled to the inverting input of error amplifier 925 and a first terminal of capacitor 930. The output of error amplifier 925 is coupled to a first terminal of resistor 940 and to the inverting input of comparator 655. A second terminal of resistor 940 is coupled to a second terminal of capacitor 930. An output of a ramp generator 950 is coupled to the non-inverting input of comparator 655. The output of comparator 655 is coupled to the reset input of flip-flop 670. The output of first sensor 645 is coupled to the control logic 650. An output of the control logic 650 is coupled to the input of pulse generator 970. The output of pulse generator 970 is coupled to the set input of flip-flop 670 and to the ramp generator 950. The output of flip-flop 670 is coupled to gate driver circuitry (290, 305, 306) for driving the gates of power switches 300, 250 in the first and second converter stages.

The control logic 650 determines a value for the switching period T based on sensed input voltage from first sensor 645 as previously discussed. The pulse generator 970 generates a series of pulses at the corresponding switching frequency (i.e., a frequency substantially equal to 1/T) or, stated another way, generates a pulse corresponding to the start of a switching period, such that at the beginning of each pulse, a new switching cycle begins. (The point designated as the start of a new switching cycle is chosen merely for convenience in describing operation of the regulator 900. Another point may be chosen within the scope of the present disclosure.) At the beginning of the switching cycle, a corresponding pulse from pulse generator 970 resets ramp generator 950 (returning its output to substantially zero) and sets flip-flop 670, driving the flip-flop 670 output high, which in turn (via gate driver circuitry (290, 305, 306) turns the power switches 300, 250 into an on and conducting state.

The second sensor 635 senses a first parameter, such as an output or inductor 260 current, as described above, and provides a corresponding current level to low pass filter 915, which averages the current level (or signal) to generate an average output (or inductor) current level. Error amplifier 925 compares the average current level from low pass filter 915 to a selected or predetermined (output or inductor) current level from memory 630, and provides a corresponding output error signal (i.e., the error amplifier 925 determines a difference (as an error) between the average current level from low pass filter 915 to a selected or predetermined (output or inductor) current level from memory 630, with the difference indicated by the corresponding DC level of the output error signal provided to the comparator 655). Resistor 940 and capacitor 930 (also referred to as compensation resistor 940 and compensation capacitor 930) are utilized to maintain a stable speed or rate of the error amplifier 925. Ramp generator 950 begins a positive ramp at the start of a switching cycle and is reset by pulse generator 970 to return to a minimum value (e.g., substantially zero) for the commencement of a next switching cycle. In a representative embodiment of the current disclosure, the ramp speed of error amplifier 925 is orders of magnitude slower than that of ramp generator 950. In another embodiment, the ramp speed of error amplifier 925 is set to be slow enough to preserve circuit stability and fast enough to track changes in output current, such as changes caused by temperature variations or aging. Comparator 655 compares the output of ramp generator 950 to the output of error amplifier 925. When the output of the ramp generator 950 has reached the level of the error signal from error amplifier 925, the comparator 655 trips and the output of comparator 945 goes high and resets flip-flop 670, thereby turning off the power switches 300, 250 in the power converter stages, which remain off until the start of the next switching cycle.

In FIGS. 4-15, representative embodiments of the present disclosure are illustrated using analog or digital circuitry. It is to be understood that there are a plurality of implementation options for the illustrative embodiments of the present disclosure, all of which are considered equivalent and within the scope of the present disclosure. In one embodiment of the present disclosure, controller 500 and the regulator are implemented using analog circuits such as amplifiers, comparators, integrators, error amplifiers, etc. In another embodiment of the present disclosure, controller 500 and the regulator are implemented using digital circuits such as digital processors, memory, gates, FPGAs, etc. In another embodiment of the disclosure, controller 500 and the regulator are implemented using a mixture of analog and digital circuits.

As indicated above, the controller 500 (including variations 500A, 500B, and 500C, and any control logic block 650) may be any type of controller or processor, and may be embodied as any type of digital logic, analog circuitry, or other circuitry adapted to perform the functionality discussed herein. As the term controller, processor, or control logic block is used herein, a controller or processor or control logic block may include use of a single integrated circuit ("IC"), or may include use of a plurality of integrated circuits or other components connected, arranged, or grouped together, such as controllers, microprocessors, digital signal processors ("DSPs"), parallel processors, multiple core processors, custom ICs, application specific integrated circuits ("ASICs"), field programmable gate arrays ("FPGAs"), adaptive computing ICs, associated memory (such as RAM, DRAM and ROM), and other ICs and components. As a consequence, as used herein, the term controller, processor, or control logic block should be understood to equivalently mean and include a single IC, or arrangement of custom ICs, ASICs, processors, microprocessors, controllers, FPGAs, adaptive computing ICs, or some other grouping of integrated circuits or electronic components which perform the functions discussed herein, with any associated memory, such as microprocessor memory or additional RAM, DRAM, SDRAM, SRAM, MRAM, ROM, PROM, FLASH, EPROM, or $E^2$PROM. A controller or processor (such as controller 500, 500A, 500B, and 500C, or control logic block 650), with its associated memory, may be adapted or configured (via programming, FPGA interconnection, or hard-wiring) to perform the methodology of the disclosure, as discussed above and below. For example, the methodology may be programmed and stored, in a controller 500 or with its associated memory 630 and other equivalent components, as a set of program instructions or other code (or equivalent configuration or other program) for subsequent execution when the controller or processor is operative (i.e., powered on and functioning). Equivalently, the controller or control logic block may be implemented in whole or in part as FPGAs, digital logic such as registers and gates, custom ICs and/or ASICs, the FPGAs, digital logic such as registers and gates, custom ICs or ASICs, also may be designed, configured and/or hard-wired to implement the methodology of the disclosure. For example, the controller or processor may be implemented as an arrangement of controllers, microcontrollers, microprocessors, state machines, DSPs and/or ASICs, which are respectively programmed, designed, adapted, or configured to implement the methodology of the disclosure, in conjunction with a memory 630.

The memory 630, which may include a data repository (or database), may be embodied in any number of forms, including within any computer or other machine-readable data storage medium, memory device, or other storage or communication device for storage or communication of information, currently known or which becomes available in the future, including, but not limited to, a memory integrated circuit ("IC"), or memory portion of an integrated circuit (such as the resident memory within a controller or processor IC), whether volatile or non-volatile, whether removable or non-removable, including without limitation, RAM, FLASH, DRAM, SDRAM, SRAM, MRAM, FeRAM, ROM, EPROM or $E^2PROM$, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. In addition, such computer-readable media includes any form of communication media which embodies computer-readable instructions, data structures, program modules, or other data in a data signal or modulated signal. The memory 630 may be adapted to store various look-up tables, parameters, coefficients, other information and data, programs, or instructions (of the software of the present disclosure), and other types of tables, such as database tables.

As indicated above, the controller or control logic block may be programmed, using software and data structures of the disclosure, for example, to perform the methodology of the present disclosure. As a consequence, the system and method of the present disclosure may be embodied as software which provides such programming or other instructions, such as a set of instructions and/or metadata embodied within a computer-readable medium, discussed above. In addition, metadata may also be utilized to define the various data structures of a look-up table or a database. Such software may be in the form of source or object code, by way of example and without limitation. Source code further may be compiled into some form of instructions or object code (including assembly language instructions or configuration information). The software, source code, or metadata of the present disclosure may be embodied as any type of code, such as C, C++, C#, SystemC, LISA, XML, Java, ECMAScript, JScript, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a "construct," "program construct," "software construct," or "software," as used equivalently herein, means and refers to any programming language, of any kind, with any syntax or signatures, which provides or can be interpreted to provide the associated functionality or methodology specified (when instantiated or loaded into a processor or computer and executed, including the controller 500, for example).

The software, metadata, or other source code of the present disclosure and any resulting bit file (object code, database, or look-up table) may be embodied within any tangible storage medium, such as any of the computer or other machine-readable data storage media, as computer-readable instructions, data structures, program modules, or other data, such as discussed above with respect to the memory 630, e.g., a floppy disk, a CDROM, a CD-RW, a DVD, a magnetic hard drive, an optical drive, or any other type of data storage apparatus or medium, as mentioned above.

In some representative embodiments of the present disclosure, control circuitry is implemented using digital circuitry such as logic gates, memory registers, a digital processor such as a microprocessor or digital signal processor, I/O devices, memory, analog-to-digital converters, digital-to-analog converters, FPGAs, etc. In other representative embodiments, this control circuitry is implemented in analog circuitry such as amplifiers, resistors, integrators, multipliers, error amplifiers, operational amplifiers, etc. For example, one or more parameters stored in digital memory may, in an analog implementation, be encoded as the value of a resistor or capacitor, the voltage of a zener diode or resistive voltage divider, or otherwise designed into the circuit. It is to be understood that embodiments illustrated as analog circuitry may alternatively be implemented with digital circuitry or with a mixture of analog and digital circuitry and that embodiments illustrated as digital circuitry may alternatively be implemented with analog circuitry or with a mixture of analog and digital circuitry within the scope of the present disclosure.

Memory 630 typically stores parameter values, controller 500 methods in the form of software, data used by control logic block for computations and executing software, etc. The memory 630 is utilized to store various parameters and reference values, such as $V_{LOW\_RMS}$, $\Delta I_{L2}$, $T_{MAX}$, $I_{REF}$, D, $I_{MAX}$, $I_{MIN}$, initial and subsequently determined values for the converter such as on-time ($t_{ON}$), off-time ($t_{OFF}$), converter switching period (T) duration (which may be in terms of time or cycles), peak current values for the output current, the first power switch current, second stage current measurements, inductance values, various maximum voltage levels, etc. Various parameters and reference values may be predetermined and pre-loaded in memory 630. Examples of predetermined parameters that may be preloaded into memory 630 include a maximum switching period $T_{MAX}$, a maximum duty ratio $D_{max}$, a minimum duty ratio Dmin, a desired output current level $I_{REF}$, a desired inductor current level, a minimum input voltage, a minimum RMS input voltage, a desired inductor ripple current $\Delta I_{L2}$, a desired output ripple current, etc. Other parameter and reference values may be received from the processor 630 and stored in memory. The memory 630 may also provide various stored values directly to the controller 500 or control logic 650, such as parameter values $t_{ON}$, T, etc.

In some embodiments, one or more of peripheral components, comprising A/D converter 615, memory 630, any oscillator or clock (not separately illustrated), D/A converter 680, and I/O interface 675 are incorporated as part of a controller 500 or regulator (600, 605, 900). Controller 500 and/or control logic 650 execute methods of control as described in the representative embodiments of the present disclosure. The controller 500 and/or control logic 650 may comprise any type of digital or sequential logic for executing the methodologies and performing selected operations as discussed above and as further described below. For example, the controller 500 and/or control logic 650 may be implemented as one or more finite state machines, various comparators, integrators, operational amplifiers, digital logic blocks, configurable logic blocks, or may be implemented to utilize an instruction set, and so on, as described herein.

D/A converter 680 converts one or more control signals from controller 500 and/or control logic 650 into an analog form and sends the one or more control signals to the various gate drivers. Instead of or in addition to D/A converter 680, ports on the I/O interface 675 may be used as controller 500 and/or control logic 650 outputs to the gate drivers (290, 305, 306). Similarly, although sensor inputs may be coupled to A/D converter(s) 615 for digital implementations of a controller 500, one or more of sensor inputs may be alternatively coupled to inputs on the I/O interface 675 (inputs not shown). It is to be noted that the term "I/O interface" is, for this purpose, interchangeable with terms "A/D converter" or "D/A converter," and I/O interface 675, A/D converter 615, and D/A converter 680 all fall into the class of I/O devices.

Numerous advantages of the representative embodiments of the present disclosure, for providing power to loads such as LEDs, are readily apparent. The representative embodiments provide control over cascaded power converters, while simultaneously reducing voltage stress. The representative embodiments are capable of providing a plurality of types of control over such power delivery, such as providing a substantially constant current output, a hysteretic current output, and overshoot protection on start up. The representative embodiments utilize a plurality of sensors which may all be referenced to a common reference node, such as ground, providing feedback signals and allowing for simpler and more robust control electronics, which further enables more accurate and fine-tuned control over power delivery and circuit protection, and enables an overall reduction in the size and cost of the converter. Representative embodiments provide significant power factor correction, i.e., a power factor which is close to unity, when connected to an AC line for input power, and further generate negligible harmonics or electromagnetic interference.

Although the disclosure has been described with respect to specific embodiments thereof, these embodiments are merely illustrative and not restrictive of the disclosure. In the description herein, numerous specific details are provided, such as examples of electronic components, electronic and structural connections, materials, and structural variations, to provide a thorough understanding of embodiments of the present disclosure. An embodiment of the disclosure can be practiced without one or more of the specific details, or with other apparatus, systems, assemblies, components, materials, parts, etc. In other instances, structures, materials, or operations are not specifically shown or described in detail to avoid obscuring aspects of embodiments of the present disclosure. In addition, the various figures are not drawn to scale and should not be regarded as limiting.

Reference throughout this specification to "one embodiment," "an embodiment," or a specific "embodiment" means that a particular feature, structure, or characteristic described in connection with the embodiment is included in at least one embodiment of the present disclosure and not necessarily in all embodiments, and further, are not necessarily referring to the same embodiment. Furthermore, the particular features, structures, or characteristics of any specific embodiment of the present disclosure may be combined in any suitable manner and in any suitable combination with one or more other embodiments, including the use of selected features without corresponding use of other features. In addition, many modifications may be made to adapt a particular application, situation, or material to the essential scope and spirit of the present disclosure. It is to be understood that other variations and modifications of the embodiments of the present disclosure described and illustrated herein are possible in light of the teachings herein and are to be considered part of the spirit and scope of the claimed subject matter.

It will also be appreciated that one or more of the elements depicted in the figures can also be implemented in a more separate or integrated manner, or even removed or rendered inoperable in certain cases, as may be useful in accordance with a particular application. Integrally formed combinations of components are also within the scope of the disclosure, particularly for embodiments in which a separation or combination of discrete components is unclear or indiscernible. In addition, use of the term "coupled" herein, including in its various forms such as "coupling" or "couplable," means and includes any direct or indirect electrical, structural, or magnetic coupling, connection or attachment, or adaptation or capability for such a direct or indirect electrical, structural or magnetic coupling, connection or attachment, including integrally formed components and components which are coupled via or through another component.

As used herein for purposes of the present disclosure, the term "LED" and its plural form "LEDs" should be understood to include any electroluminescent diode or other type of carrier injection- or junction-based system which is capable of generating radiation in response to an electrical signal, including without limitation, various semiconductor- or carbon-based structures which emit light in response to a current or voltage, light-emitting polymers, organic LEDs, and so on, including within the visible spectrum, or other spectra such as ultraviolet or infrared, of any bandwidth, or of any color or color temperature.

In the foregoing description and in the figures, sense resistors are shown in representative configurations and locations; however, other types and configurations of sensors may also be used and that sensors may be placed in other locations. Alternate sensor configurations and placements are within the scope of the present disclosure.

As used herein, the term "DC" denotes both fluctuating DC (such as is obtained from rectified AC) and constant voltage DC (such as is obtained from a battery, voltage regulator, or power filtered with a capacitor). As used herein, the term "AC" denotes any form of alternating current with any waveform (sinusoidal, sine squared, rectified sinusoidal, square, rectangular, triangular, sawtooth, irregular, etc.) and with any DC offset and may include any variation such as chopped or forward- or reverse-phase modulated alternating current, such as from a dimmer switch.

With respect to sensors, we refer herein to parameters that "represent" a given metric or are "representative" of a given metric, where a metric is a measure of a state of at least part of the regulator or its inputs or outputs. For example, we note that $I_{LOAD}$ "represents" the load current and we say that inductor current $I_{L2}$ may be used to "represent" the load current. A parameter is considered to represent a metric if it is related to the metric directly enough that regulating the parameter will satisfactorily regulate the metric. For example, the metric of LED current may be represented by $I_2$, the average current of inductor $L_2$, because they are similar and because regulating $I_{L2}$ satisfactorily regulates $I_{LED}$. In the case of output current (such as LED current), a parameter is considered to represent output current if it is related to the output current directly enough that regulating the parameter will satisfactorily regulate the output current. A parameter may be considered to be an acceptable representation of a metric if it represents a multiple or fraction of the metric. It is to be noted that a parameter may physically be a voltage and yet still represents a current value. For example, the voltage across a sense resistor "represents" current through the resistor.

In the foregoing description of illustrative embodiments and in attached figures where diodes are shown, it is to be understood that synchronous diodes or synchronous rectifiers (for example, relays or MOSFETs or other transistors switched off and on by a control signal) or other types of diodes may be used in place of standard diodes within the scope of the present disclosure. Representative embodiments presented here generally generate a positive output voltage with respect to ground; however, the teachings of the present disclosure apply also to power converters that generate a negative output voltage, where complementary topologies may be constructed by reversing the polarity of semiconductors and other polarized components.

For convenience in notation and description, transformers such as first transformer 230 are referred to as a "transformer," although in illustrative embodiments, it behaves in many respects also as an inductor. In fact, in alternative embodiments, first transformer 230 is replaced with one or more simple inductors by making appropriate adjustments to the circuit topology, with FIG. 7 as an example. Similarly, inductors can, under proper conditions, be replaced by transformers. We refer to transformers and inductors as "inductive elements," with the understanding that they perform similar functions and may be interchanged within the scope of the present disclosure.

Furthermore, any signal arrows in the drawings/figures should be considered only representative, and not limiting, unless otherwise specifically noted. Combinations of components of steps will also be considered within the scope of the present disclosure, particularly where the ability to separate or combine is unclear or foreseeable. The disjunctive term "or," as used herein and throughout the claims that follow, is generally intended to mean "and/or," having both conjunctive and disjunctive meanings (and is not confined to an "exclusive or" meaning), unless otherwise indicated. As used in the description herein and throughout the claims that follow, "a," "an," and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present disclosure, including what is described in the summary or in the abstract, is not intended to be exhaustive or to limit the disclosure to the precise forms disclosed herein. From the foregoing, it will be observed that numerous variations, modifications, and substitutions are intended and may be effected without departing from the spirit and scope of the claimed subject matter. It is to be understood that no limitation with respect to the specific methods and apparatus illustrated herein is intended or should be inferred. It is, of course, intended to cover by the appended claims all such modifications as fall within the scope of the claims.

The embodiments of the invention in which an exclusive property or privilege is claimed are defined as follows:

1. An apparatus for power conversion, the apparatus comprising:
a first power converter stage including a first power switch;
a second power converter stage coupled to the first power converter stage, wherein the second power converter stage includes a second power switch, and wherein the second power converter stage is couplable to provide an output current to a load;
a first sensor configured to sense an electrical parameter; and
a controller coupled to the first power switch, the second power switch, and the first sensor, wherein the controller is configured to turn the first and second power switches into an on-state at a frequency substantially corresponding to a switching period.

2. The apparatus of claim 1, wherein the controller is further configured to determine the switching period as a switching interval that maintains voltage stress of the first power switch and the second power switch below corresponding predetermined levels.

3. The apparatus of claim 1, wherein the controller is further configured to maintain a switching duty cycle within a predetermined range to maintain voltage stress of the first power switch and the second power switch below corresponding predetermined levels.

4. The apparatus of claim 1, wherein the controller is further configured to turn the first and second power switches into the on-state and into an off-state substantially concurrently.

5. The apparatus of claim 1, wherein the first sensor is coupled to the second power converter stage, and wherein the electrical parameter is a current level corresponding to the output current.

6. The apparatus of claim 5, wherein the first power converter stage is couplable to receive an input voltage, and wherein the apparatus further comprises:
a second sensor coupled to the first power converter stage, wherein the second sensor is configured to sense an input voltage level.

7. The apparatus of claim 6, wherein the controller is further configured to turn the first and second power switches into the on-state and into an off-state with the switching period determined in response to the electrical parameter.

8. The apparatus of claim 6, wherein the controller is further configured to turn the first and second power switches into an off-state in response to an increase in the electrical parameter to a first threshold.

9. The apparatus of claim 8, wherein the controller is further configured to determine the first threshold based on a predetermined reference current level, a predetermined current variance level, a minimum input voltage level, and the sensed input voltage level.

10. The apparatus of claim 8, wherein the controller is further configured to determine the first threshold ($I_{MAX}$) as substantially proportional to a predetermined reference current level ($I_{REF}$) plus an offset term comprising a predetermined current variance level ($\Delta I_{L2}$) multiplied by the square of a minimum RMS input voltage ($V^2_{LOW\_RMS}$) and divided by twice the square of an RMS value of the sensed input voltage ($2*V^2_{IN\_RMS}$), namely ($I_{MAX} \propto I_{REF} + (\Delta I_{L2}*V^2_{LOW\_RMS}/2*V^2_{IN\_RMS})$).

11. The apparatus of claim 8, wherein the controller is further configured to turn the first and second power switches into the on-state in response to a decrease in the electrical parameter to a second threshold.

12. The apparatus of claim 11, wherein the controller is further configured to determine the second threshold based on a predetermined reference current level, a predetermined current variance level, a minimum input voltage level, and the sensed input voltage level.

13. The apparatus of claim 11, wherein the controller is further configured to determine the second threshold ($I_{MIN}$) as substantially proportional to a predetermined reference current level ($I_{REF}$) minus an offset term comprising a predetermined current variance level ($\Delta I_{L2}$) multiplied by the square of a minimum RMS input voltage ($V^2_{LOW\_RMS}$) and divided by twice the square of an RMS value of the sensed input voltage ($2*V^2_{IN\_RMS}$), namely ($I_{MIN} \propto I_{REF} - (\Delta I_{L2}*V^2_{LOW\_RMS}/2*V^2_{IN\_RMS})$).

14. The apparatus of claim 11, further comprising:
a memory configured to store a look-up table, wherein the look-up table includes a plurality of first and second thresholds corresponding to a plurality of input voltage levels.

15. The apparatus of claim 14, wherein the controller is further configured to determine the first threshold and the second threshold by accessing the look-up table using the sensed input voltage level.

16. The apparatus of claim 6, wherein the switching period corresponds to a first threshold and to a second threshold, and wherein the controller is further configured to turn the first and second power switches into an off-state in response to an increase in the electrical parameter to the first threshold and into the on-state in response to a decrease in the electrical parameter to the second threshold.

17. The apparatus of claim 6, wherein the controller is further configured to determine the switching period in response to the sensed input voltage level.

18. The apparatus of claim 17, further comprising:
a memory configured to store a look-up table, wherein the look-up table includes a plurality of switching period values corresponding to a plurality of input voltage levels.

19. The apparatus of claim 18, wherein the controller is further configured to determine the switching period by accessing the look-up table using the sensed input voltage level.

20. The apparatus of claim 6, wherein the controller is further configured to determine the switching period based on a maximum switching period, a minimum input voltage, and the sensed input voltage level.

21. The apparatus of claim 6, wherein the controller is further configured to determine the switching period (T) as substantially proportional to a maximum switching period ($T_{MAX}$) multiplied by the square of a minimum RMS input voltage and divided by the square of an RMS value of the sensed input voltage level, namely, ($T \propto T_{MAX}*V^2_{LOW\_RMS}/V^2_{IN\_RMS}$).

22. The apparatus of claim 6, wherein the controller is further configured to determine the switching period (T) as substantially proportional to a minimum switching period ($T_{MIN}$) multiplied by the square of a maximum RMS input voltage and divided by the square of an RMS value of the sensed input voltage level, namely, ($T \propto T_{MIN}*V^2_{HIGH\_RMS}/V^2_{IN\_RMS}$).

23. The apparatus of claim 6, wherein the controller is further configured to determine the switching period (T) as substantially proportional to a selected switching period ($T_1$) multiplied by the square of a selected RMS input voltage ($V^2_{1\_RMS}$) and divided by the square of an RMS value of the sensed input voltage level, namely, ($T \propto T_1*V^2_{1\_RMS}/V^2_{IN\_RMS}$).

24. The apparatus of claim 5, wherein the controller is further configured to decrease the duty cycle in response to the output current being above a first predetermined level.

25. The apparatus of claim 5, wherein the controller is further configured to increase the duty cycle in response to the output current being below a second predetermined level.

26. The apparatus of claim 1, further comprising:
a memory configured to store a predetermined parameter, wherein the predetermined parameter includes one of the following parameters: a minimum switching period, a maximum switching period, a maximum duty ratio, a minimum duty ratio, a desired output current level, a desired inductor current level, a maximum input voltage, a minimum input voltage, a minimum RMS input voltage, a desired inductor ripple current, a desired output ripple current, or a maximum voltage stress level.

27. The apparatus of claim 1, wherein the first power converter stage further comprises a flyback configuration, a buck configuration, or a double-buck configuration.

28. The apparatus of claim 1, wherein the second power converter stage further comprises a buck configuration, a boost configuration, or a buck-boost configuration.

29. The apparatus of claim 1, wherein the first power converter stage further comprises a transformer and the second power converter stage further comprises an inductor.

30. The apparatus of claim 1, wherein the first power converter stage further comprises a first inductor and the second power converter stage further comprises a second inductor.

31. The apparatus of claim 6, wherein the first sensor and the second sensor are referenced to a common reference.

32. The apparatus of claim 31, wherein the common reference is a ground potential.

33. The apparatus of claim 1, wherein the load comprises a light-emitting diode.

34. The apparatus of claim 1, wherein the controller is further configured to operate the first power converter stage in a discontinuous conduction mode and to operate the second power converter stage in a continuous conduction mode.

35. The apparatus of claim 1, wherein the first power converter stage is couplable to receive an input voltage having a predetermined range of voltages.

36. The apparatus of claim 35, wherein the predetermined range of voltages is substantially from 90 V RMS to 264 V RMS.

37. The apparatus of claim 35, wherein the first power converter stage further comprises a rectifier couplable to receive an AC input voltage.

38. The apparatus of claim 1, wherein the first power converter stage further comprises a diode, and wherein the controller is further configured to determine a switching period as a switching interval that maintains voltage stress of the diode below a predetermined level or is configured to maintain a switching duty cycle within a predetermined range to maintain voltage stress of the diode below the predetermined level.

39. The apparatus of claim 1, wherein the first power converter stage is couplable to receive an input voltage, wherein the first sensor is coupled to the first power converter stage, and wherein the electrical parameter is an input voltage level corresponding to the input voltage.

40. A method of providing power conversion for a load using a power converter, the method comprising:
sensing a first parameter including an input voltage level of an input voltage to the power converter, wherein the power converter comprises a first power converter stage coupled to a second power converter stage, wherein the first power converter stage includes a first power switch, and wherein the second power converter stage includes a second power switch;
sensing a second parameter, wherein the second parameter includes an output current of the power converter or a current of the second power switch;
turning the first and second power switches into an on-state substantially concurrently and at a frequency substantially corresponding to a switching period; and turning the first and second power switches into an off-state substantially concurrently while maintaining a switching duty cycle within a predetermined range.

41. The method of claim 40, wherein the switching duty cycle is substantially constant.

42. The method of claim 40, wherein the switching period corresponds to a first threshold and to a second threshold, wherein said turning the first and second power switches into an off-state comprises turning the first and second power switches into the off-state in response to an increase in the first parameter to the first threshold, and wherein said turning the first and second power switches into an on-state comprises turning the first and second power switches into the on-state in response to a decrease in the first parameter to the second threshold.

43. The method of claim 42, further comprising:
using a predetermined reference current level, a predetermined current variance level, a minimum input voltage level, and the sensed input voltage level, determining the first threshold and the second threshold.

44. The method of claim 42, further comprising:
using the sensed input voltage level, accessing a memory to determine the first threshold and the second threshold.

45. The method of claim 40, further comprising:
using the sensed input voltage level, accessing a memory to determine the switching period.

46. The method of claim 40, further comprising:
using a maximum switching period, a minimum input voltage level, and the sensed input voltage level, determining the switching period.

47. The method of claim 40, further comprising:
decreasing the switching duty cycle in response to the output current being above a first predetermined level; and
increasing the switching duty cycle in response to the output current being below a second predetermined level.

48. The method of claim 40, further comprising:
operating the first power converter stage in a discontinuous conduction mode; and
operating the second power converter stage in a continuous conduction mode.

49. The method of claim 40, further comprising:
receiving the input voltage having a predetermined range of voltage levels.

50. A computer-readable medium having instructions stored thereon that, in response to execution by a computing device, cause the computing device to:
sense a first parameter comprising an input voltage level of an input voltage to a power converter, wherein the power converter comprises a first power converter stage coupled to a second power converter stage, wherein the first power converter stage includes a first power switch, and wherein the second power converter stage includes a second power switch;
sense a second parameter comprising an output current of the power converter or a current of the second power switch;
turn the first power switch and the second power switch into an on-state substantially concurrently and at a frequency substantially corresponding to a switching period; and
turn the first and second power switches into an off-state substantially concurrently while maintaining a switching duty cycle within a predetermined range.

51. The computer-readable medium of claim 50, further comprising instructions that, in response to execution by the computing device, cause the computing device to:
turn the first and second power switches into the off-state in response to an increase in the first parameter to a first threshold, wherein the switching period corresponds to the first threshold and a second threshold; and
turn the first and second power switches into the on-state in response to a decrease in the first parameter to the second threshold.

52. The computer-readable medium of claim 51, further comprising instructions that, in response to execution by the computing device, cause the computing device to determine the first threshold and the second threshold using a predetermined reference current level, a predetermined current variance level, a minimum input voltage level, and the sensed input voltage level.

53. The computer-readable medium of claim 51, further comprising instructions that, in response to execution by the computing device, cause the computing device to access a memory to determine the first threshold and the second threshold using the sensed input voltage level.

54. The computer-readable medium of claim 50, further comprising instructions that, in response to execution by the computing device, cause the computing device to access a memory to determine the switching period using the sensed input voltage level.

55. The computer-readable medium of claim 50, further comprising instructions that, in response to execution by the computing device, cause the computing device to determine the switching period using a maximum switching period, a minimum input voltage level, and the sensed input voltage level.

56. The computer-readable medium of claim 50, further comprising instructions that, in response to execution by the computing device, cause the computing device to:
decrease the switching duty cycle in response to the output current being above a first predetermined level; and
increase the switching duty cycle in response to the output current being below a second predetermined level.

57. The computer-readable medium of claim 50, further comprising instructions that, in response to execution by the computing device, cause the computing device to:
operate the first power converter stage in a discontinuous conduction mode; and
operate the second power converter stage in a continuous conduction mode.

58. A system for power conversion, the system comprising:
a plurality of loads;
a first power converter stage configured to have a flyback configuration, wherein the first power converter stage includes a first power switch;
a first sensor coupled to the first power converter stage, wherein the first sensor is configured to sense an input voltage level of the first power converter stage;
a second power converter stage having a buck configuration and coupled to the first power converter stage, wherein the second power converter stage includes a second power switch and an inductor, and wherein the second power converter stage is coupled to the plurality of loads to provide an output current to the plurality of loads;
a second sensor coupled to the second power converter stage, wherein the second sensor is configured to sense an output current level or a current level in the inductor; and
a controller coupled to the first power switch, the second power switch, the first sensor, and the second sensor, wherein the controller is configured to turn the first and second power switches into an on-state at a frequency substantially corresponding to a switching period while maintaining a switching duty cycle within a predetermined range.

* * * * *